US012731865B2

(12) United States Patent
Sato et al.

(10) Patent No.: US 12,731,865 B2
(45) Date of Patent: Sep. 8, 2026

(54) COMPOSITION FOR NON-AQUEOUS SECONDARY BATTERY ADHESIVE LAYER, ADHESIVE LAYER FOR NON-AQUEOUS SECONDARY BATTERY AND METHOD FOR PRODUCING THE SAME, LAMINATE FOR NON-AQUEOUS SECONDARY BATTERY AND METHOD FOR PRODUCING THE SAME, AND NON-AQUEOUS SECONDARY BATTERY

(71) Applicant: ZEON CORPORATION, Tokyo (JP)

(72) Inventors: Masanobu Sato, Tokyo (JP); Yutaka Maruhashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 550 days.

(21) Appl. No.: 18/548,256

(22) PCT Filed: Mar. 17, 2022

(86) PCT No.: PCT/JP2022/012468

§ 371 (c)(1),
(2) Date: Aug. 29, 2023

(87) PCT Pub. No.: WO2022/209997

PCT Pub. Date: Oct. 6, 2022

(65) Prior Publication Data

US 2024/0120617 A1 Apr. 11, 2024

(30) Foreign Application Priority Data

Mar. 30, 2021 (JP) ................................ 2021-058524

(51) Int. Cl.
*C08F 220/18* (2006.01)
*C08F 265/06* (2006.01)
(Continued)

(52) U.S. Cl.
CPC ......... *H01M 50/461* (2021.01); *C08F 265/06* (2013.01); *C09D 133/08* (2013.01);
(Continued)

(58) Field of Classification Search
CPC .............. C09J 2425/00; C09J 2433/00; C09D 133/00–12; C08F 220/1808; C08F 212/08; C08F 220/06; C08F 222/102
(Continued)

(56) References Cited

U.S. PATENT DOCUMENTS

2009/0034158 A1* 2/2009 Sasaki .................... H01G 11/38 361/502
2013/0330622 A1* 12/2013 Sasaki ................. H01M 4/1395 252/182.1

(Continued)

FOREIGN PATENT DOCUMENTS

EP 4084171 A1 11/2022
JP 2013145763 A 7/2013

(Continued)

OTHER PUBLICATIONS

Oct. 3, 2023, International Preliminary Report on Patentability issued in the International Patent Application No. PCT/JP2022/012468.

(Continued)

*Primary Examiner* — Aaron Austin
*Assistant Examiner* — Jenna X. Colton
(74) *Attorney, Agent, or Firm* — KENJA IP LAW PC

(57) ABSTRACT

Disclosed is a composition for a non-aqueous secondary battery adhesive layer which comprises a particulate polymer, wherein a value of pressure sensitivity of adhesion strength as obtained using the following formula (1) is greater than 20 and less than 80: pressure sensitivity of adhesion strength (N/(m·MPa))=(T3−T1)/2 . . . (1), where
(Continued)

T1 represents an adhesion strength (N/m) between a polyethylene separator and an adhesive layer for a non-aqueous secondary battery adhesive layer that is obtained from the composition for a non-aqueous secondary battery adhesive layer when the polyethylene separator and the adhesive layer are bonded by pressing at 25° C. and a pressure of 1 MPa for 10 seconds, and T3 represents an adhesion strength (N/m) between the polyethylene separator and the adhesive layer when the polyethylene separator and the adhesive layer are bonded by pressing at 25° C. and a pressure of 3 MPa for 10 seconds.

8 Claims, 3 Drawing Sheets

(51) Int. Cl.

| | |
|---|---|
| ***C09D 133/08*** | (2006.01) |
| ***C09D 151/00*** | (2006.01) |
| ***C09J 7/38*** | (2018.01) |
| ***C09J 133/08*** | (2006.01) |
| ***C09J 151/00*** | (2006.01) |
| ***H01M 4/13*** | (2010.01) |
| ***H01M 4/139*** | (2010.01) |
| ***H01M 50/403*** | (2021.01) |
| ***H01M 50/414*** | (2021.01) |
| ***H01M 50/417*** | (2021.01) |
| ***H01M 50/42*** | (2021.01) |
| ***H01M 50/443*** | (2021.01) |
| ***H01M 50/449*** | (2021.01) |
| ***H01M 50/46*** | (2021.01) |
| ***H01M 50/489*** | (2021.01) |

(52) U.S. Cl.
CPC .......... *C09D 151/003* (2013.01); *C09J 7/385* (2018.01); *C09J 133/08* (2013.01); *C09J 151/003* (2013.01); *H01M 4/13* (2013.01); *H01M 4/139* (2013.01); *H01M 50/403* (2021.01); *H01M 50/414* (2021.01); *H01M 50/417* (2021.01); *H01M 50/42* (2021.01); *H01M 50/443* (2021.01); *H01M 50/449* (2021.01); *H01M 50/46* (2021.01); *H01M 50/489* (2021.01); *C08F 220/1804* (2020.02); *C08F 220/1808* (2020.02); *C09J 2203/33* (2013.01); *C09J 2425/00* (2013.01)

(58) Field of Classification Search
USPC .......................................................... 429/246
See application file for complete search history.

(56) References Cited

U.S. PATENT DOCUMENTS

| | | | | |
|---|---|---|---|---|
| 2014/0227603 | A1 | 8/2014 | Ogata | |
| 2015/0188108 | A1* | 7/2015 | Miyazawa | H01M 50/491<br>156/60 |
| 2016/0141575 | A1* | 5/2016 | Sasaki | B32B 27/00<br>429/246 |
| 2016/0141581 | A1* | 5/2016 | Sasaki | H01M 10/0525<br>429/144 |
| 2016/0268565 | A1 | 9/2016 | Sasaki et al. | |
| 2017/0155107 | A1 | 6/2017 | Akiike et al. | |
| 2017/0214022 | A1* | 7/2017 | Sasaki | H01M 4/13 |
| 2018/0130987 | A1 | 5/2018 | Takamatsu | |
| 2021/0296732 | A1 | 9/2021 | Koga et al. | |
| 2021/0313580 | A1 | 10/2021 | Tanaka | |

FOREIGN PATENT DOCUMENTS

| | | | | | |
|---|---|---|---|---|---|
| JP | 2016072151 | A | * | 5/2016 | |
| KR | 1020170039620 | A | | 4/2017 | |
| WO | 2012115096 | A1 | | 8/2012 | |
| WO | 2013047853 | A1 | | 4/2013 | |
| WO | WO-2013147006 | A1 | * | 10/2013 | H01M 50/42 |
| WO | WO-2013175898 | A1 | * | 11/2013 | C09J 7/22 |
| WO | 2015064411 | A1 | | 5/2015 | |
| WO | 2016017066 | A1 | | 2/2016 | |
| WO | 2016084330 | A1 | | 6/2016 | |
| WO | WO-2017094250 | A1 | * | 6/2017 | C09J 201/00 |
| WO | WO-2018180811 | A1 | * | 10/2018 | C08K 5/41 |
| WO | 2019221056 | A1 | | 11/2019 | |
| WO | 2020045246 | A1 | | 3/2020 | |

OTHER PUBLICATIONS

Mar. 3, 2025, the Extended European Search Report issued by the European Patent Office in the corresponding European Patent Application No. 22780216.2.

* cited by examiner

COMPOSITION FOR NON-AQUEOUS SECONDARY BATTERY ADHESIVE LAYER, ADHESIVE LAYER FOR NON-AQUEOUS SECONDARY BATTERY AND METHOD FOR PRODUCING THE SAME, LAMINATE FOR NON-AQUEOUS SECONDARY BATTERY AND METHOD FOR PRODUCING THE SAME, AND NON-AQUEOUS SECONDARY BATTERY

TECHNICAL FIELD

The present disclosure relates to a composition for a non-aqueous secondary battery adhesive layer, an adhesive layer for a non-aqueous secondary battery and a method for producing the same, a laminate for a non-aqueous secondary battery and a method for producing the same, and a non-aqueous secondary battery.

BACKGROUND

Non-aqueous secondary batteries (hereinafter also referred to as "secondary batteries") such as lithium-ion secondary batteries are finding a wide range of applications for their small size, light weight, high energy density, and capability of being repeatedly charged/discharged. A secondary battery generally includes battery members, such as a positive electrode, a negative electrode, and a separator that separates the positive and negative electrodes from each other to prevent a short circuit between the positive and negative electrodes.

In a secondary battery, battery members are used that are provided with an adhesive layer for improving adhesion between the battery members. Specific examples of such battery members include: electrodes that further comprise an adhesive layer formed on an electrode substrate composed of a current collector and an electrode mixed material layer provided on the current collector; and separators that comprise an adhesive layer formed on a separator substrate. The adhesive layer is usually formed by supplying onto a substrate such as an electrode or separator substrate a slurry-like composition for a non-aqueous secondary battery adhesive layer (hereinafter, also referred to as a "composition for an adhesive layer") containing a binder component and a solvent such as water, and drying the composition.

In recent years, attempts have been made to form an adhesive layer (adhesive material) by discharging fine droplets of an adhesive composition by the ink jet method in an aim to allow secondary batteries to exhibit good battery characteristics while firmly bonding battery members to each other, as well as to increase the production efficiency of the secondary battery.

For example, PTL 1 describes applying a slurry for a non-aqueous secondary battery that comprises a particulate polymer having a core-shell structure, a predetermined amount of a polyhydric alcohol compound and water by the ink jet method. PTL 1 reports that the use of such a slurry makes it possible to efficiently apply an adhesive material to the surface of battery members while ensuring strong adhesion between the battery members as well as good low-temperature output characteristics of the secondary battery even when the ink jet method is used.

PTL 2 discloses applying a composition for an adhesive layer that comprises organic particles having a core-shell structure, a thixotropic agent, and water and that satisfies a predetermined property by the ink jet method. PTL 2 reports that the use of such a composition for an adhesive layer makes it possible to form a good adhesive layer even when the ink jet method is used, and that a substrate and an adherend can be firmly bonded to each other via the adhesive layer.

CITATION LIST

Patent Literature

[PTL 1] WO2019/221056
[PTL 2] WO2020/045246

SUMMARY

Technical Problem

According to studies conducted by the present inventors, however, it has been discovered that although the conventional slurries for a non-aqueous secondary battery and the compositions for an adhesive layer described above can be satisfactorily applied on battery members by the ink jet method, when the battery members are bonded to each other by pressing at normal temperature via an adhesive layer (adhesive material) obtained by drying the composition for an adhesive layer applied in a manufacturing process of a secondary battery, the adhesion between the battery members is not sufficient, the productivity of the secondary battery is impaired, and further, the battery characteristics are deteriorated.

That is, there is still room for improvement in terms of firmly bonding battery members to each other by pressing at normal temperature and imparting good battery characteristics to secondary batteries while securing inkjet discharge characteristics.

Accordingly, an object of the present disclosure is to provide a composition for a non-aqueous secondary battery adhesive layer that can provide a non-aqueous secondary battery adhesive layer capable of bonding battery members to each other by pressing at normal temperature and that can impart good battery characteristics to secondary batteries while securing inkjet discharge characteristics.

Another object of the present disclosure is to provide an adhesive layer for a non-aqueous secondary battery that can firmly bond battery members to each other by pressing at normal temperature and that can allow a non-aqueous secondary battery to exhibit good electrical characteristics.

Still another object of the present disclosure is to provide a laminate for a non-aqueous secondary battery that can allow a non-aqueous secondary battery to exhibit good electrical characteristics.

Yet another object of the present disclosure is to provide a non-aqueous secondary battery having good electrical characteristics.

A further object of the present disclosure is to provide a method for producing an adhesive layer for a non-aqueous secondary battery, which adhesive layer can firmly bond battery members to each other by pressing at normal temperature and can allow a non-aqueous secondary battery to exhibit good electrical characteristics.

A still further object of the present disclosure is to provide a method for producing a laminate for a non-aqueous secondary battery, which laminate can allow a non-aqueous secondary battery to exhibit good electrical characteristics.

Solution to Problem

The inventors conducted diligent investigation with the aim of solving the problem described above. The present inventors have established that the use of a composition for a non-aqueous secondary battery adhesive layer whose degree of change in adhesion strength when a polyethylene separator and an adhesive layer for a non-aqueous secondary battery adhesive layer that is obtained from the composition for a non-aqueous secondary battery adhesive layer are bonded by pressing at different pressures under a predetermined condition (i.e., pressure sensitivity) satisfies a predetermined relationship makes it possible to bond battery members to each other by pressing at normal temperature and to impart good battery characteristics to the secondary battery while securing inkjet discharge characteristics. The inventors thus completed the present disclosure.

That is, the present disclosure aims to advantageously solve the above problem, and the disclosed composition for a non-aqueous secondary battery adhesive layer comprises a particulate polymer, wherein a value of pressure sensitivity of adhesion strength as obtained using the following formula (1) is greater than 20 and less than 80:

$$\text{pressure sensitivity of adhesion strength (N/(m·MPa))}=(T3-T1)/2 \quad (1)$$

where T1 represents an adhesion strength between a polyethylene separator and an adhesive layer for a non-aqueous secondary battery adhesive layer that is obtained from the composition for a non-aqueous secondary battery adhesive layer when the polyethylene separator and the adhesive layer are bonded by pressing at 25° C. and a pressure of 1 MPa for 10 seconds, and T3 represents an adhesion strength (N/m) between the polyethylene separator and the adhesive layer when the polyethylene separator and the adhesive layer are bonded by pressing at 25° C. and a pressure of 3 MPa for 10 seconds. By using the composition for a non-aqueous secondary battery adhesive layer whose pressure sensitivity of adhesion strength falls within a predetermined range as described above, it is possible to firmly bond battery members to each other by pressing at normal temperature and to allow a non-aqueous secondary battery to exhibit good battery characteristics while ensuring inkjet discharge characteristics.

In the present disclosure, pressure sensitivity of adhesion strength can be measured by the method described in the Examples section of the present specification.

In the disclosed composition for a non-aqueous secondary battery adhesive layer, it is preferred that the particulate polymer has a core-shell structure comprising a core and a shell partially covering an outer surface of the core, the core has a glass transition temperature of −50° C. or higher and 25° C. or lower, the shell has a glass transition temperature of 50° C. or higher and 200° C. or lower, and the mass percentage of the shell with respect to a total of the core and the shell is 2% by mass or more and 15% by mass or less. The use of a particulate polymer which has a core-shell structure comprising a core and a shell partially covering the outer surface of the core, wherein the glass transition temperature of the core and the glass transition temperature of the shell fall within predetermined ranges, and the mass percentage of the shell with respect to the total of the core and the shell falls within a predetermined range can further improve the inkjet discharge characteristics by preventing clogging of nozzles when the ink jet method is used, allow battery members to be more firmly bonded to each other by pressing at normal temperature, and allow the non-aqueous secondary battery to exhibit better battery characteristics.

Glass transition temperatures herein can be measured by the method described in the Examples section of the present specification.

In the disclosed composition for a non-aqueous secondary battery adhesive layer, it is preferred that the core has a glass transition temperature of −40° C. or higher and 25° C. or lower. When the glass transition temperature of the core falls within the predetermined range as described above, the inkjet discharge characteristics can be further improved.

In the disclosed composition for a non-aqueous secondary battery adhesive layer, it is preferred that the particulate polymer has a volume-average particle diameter of 100 nm or more and 1,500 nm or less. When the volume-average particle diameter of the particulate polymer is 100 nm or more, deterioration of battery characteristics due to resistance increases in the secondary battery, caused by inhibition of the passage of lithium ions in the substrate (electrode or separator), can be suppressed. When the volume-average particle diameter is 1,500 nm or less, it is possible to further suppress clogging of nozzles when the composition is applied by the inkjet method to improve inkjet discharge characteristics.

The term "volume-average particle diameter" as used herein refers to a particle diameter at which the cumulative volume calculated from the small diameter side becomes 50% in a volume-based particle size distribution as measured by the laser diffraction method and can be measured using the method described in the Examples section of the present specification.

Further, the present disclosure aims to advantageously solve the above-described problem, and the disclosed adhesive layer for a non-aqueous secondary battery is obtained using any of the compositions for a non-aqueous secondary battery adhesive layer described above. An adhesive layer for a non-aqueous secondary battery formed using any of the compositions for a non-aqueous secondary battery adhesive layer described above can firmly bond battery members such as separators and electrodes to each other by pressing at normal temperature and can also allow the non-aqueous secondary battery to exhibit good battery characteristics.

Further, the present disclosure aims to advantageously solve the above-described problems, and the disclosed method for producing an adhesive layer for a non-aqueous secondary battery comprises: applying on a substrate any of the compositions for a non-aqueous secondary battery adhesive layer described above by the inkjet method; and drying the composition for a non-aqueous secondary battery adhesive layer applied on the substrate. When any of the compositions for a non-aqueous secondary battery adhesive layer described above is used, even in the case where the inkjet method is employed, occurrence of nozzle clogging is suppressed to ensure inkjet discharge characteristics, whereby an adhesive layer for a non-aqueous secondary battery can be favorably formed on a substrate.

Further, the present disclosure aims to advantageously solve the above-described problems, and the disclosed laminate for a non-aqueous secondary battery comprises an electrode and a separator, wherein the electrode and the separator are bonded to each other via the adhesive layer for a non-aqueous secondary battery described above. In a laminate for a non-aqueous secondary battery that comprises battery members bonded together with the above-described adhesive layer for a non-aqueous secondary battery as described above, the battery members are firmly bonded to each other, allowing a non-aqueous secondary battery comprising the laminate to exhibit good battery characteristics.

Further, the present disclosure aims to advantageously solve the above problem, and the disclosed method for producing a laminate for a non-aqueous secondary battery comprises: supplying an adhesive material to a bonding surface of at least one of an electrode and a separator; and bonding the electrode and the separator via the bonding surface supplied with the adhesive material by pressing at normal temperature, wherein the adhesive material is obtained using any of the compositions for a non-aqueous secondary battery adhesive layer described above. When an adhesive material obtained from any of the compositions for a non-aqueous secondary battery adhesive layer is used as described above, electrodes can be firmly bonded to each other at normal temperature.

The term "normal temperature" as used herein refers to a temperature in the range of 25±5° C.

Further, the present disclosure aims to advantageously solve the above problem, and the disclosed non-aqueous secondary battery comprises the laminate for a non-aqueous secondary battery described above. A non-aqueous secondary battery that comprises the laminate for a non-aqueous secondary battery as described above can exhibit good battery characteristics.

Advantageous Effect

According to the present disclosure, it is possible to provide a composition for a non-aqueous secondary battery adhesive layer that can provide a non-aqueous secondary battery adhesive layer capable of firmly bonding battery members to each other by pressing at normal temperature and that can allow a non-aqueous secondary battery to exhibit good battery characteristics while securing inkjet discharge characteristics.

According to the present disclosure, it is also possible to provide an adhesive layer for a non-aqueous secondary battery that can firmly bond battery members to each other by pressing at normal temperature and that can allow a non-aqueous secondary battery to exhibit good electrical characteristics.

According to the present disclosure, it is also possible to provide a laminate for a non-aqueous secondary battery that can allow a non-aqueous secondary battery to exhibit good electrical characteristics.

According to the present disclosure, it is also possible to provide a non-aqueous secondary battery having good electrical characteristics.

According to the present disclosure, it is also possible to provide a method for producing an adhesive layer for a non-aqueous secondary battery, which adhesive layer can firmly bond battery members to each other by pressing at normal temperature and can allow a non-aqueous secondary battery to exhibit good electrical characteristics.

According to the present disclosure, it is also possible to provide a method for producing a laminate for a non-aqueous secondary battery, which laminate can allow a non-aqueous secondary battery to exhibit good electrical characteristics.

DETAILED DESCRIPTION

Figure 1:
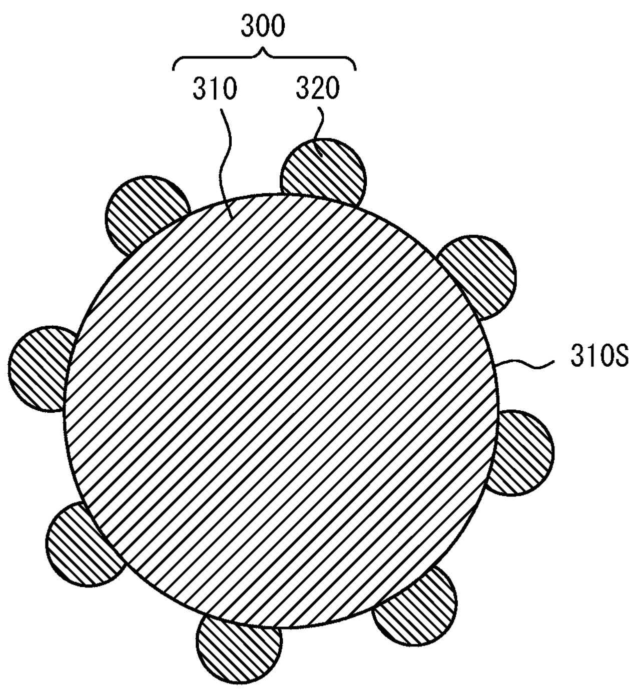
FIG. 1 is a cross-sectional view schematically showing a structure of an example of a particulate polymer.

The following provides a detailed description of an embodiment of the present disclosure.

The disclosed composition for a non-aqueous secondary battery adhesive layer can be used when forming an adhesive layer for a non-aqueous secondary battery. The disclosed adhesive layer for a non-aqueous secondary battery can be produced for example by the disclosed method for producing an adhesive layer for a non-aqueous secondary battery. The disclosed adhesive layer for a non-aqueous secondary battery can be used when producing the disclosed laminate for a non-aqueous secondary battery and the disclosed non-aqueous secondary battery. The disclosed laminate for a non-aqueous secondary battery can be used when producing the disclosed non-aqueous secondary battery and can be produced for example by the disclosed method for producing a laminate for a non-aqueous secondary battery. The disclosed non-aqueous secondary battery comprises the disclosed laminate for a non-aqueous secondary battery.

Composition for Non-Aqueous Secondary Battery Adhesive Layer

The disclosed composition for a non-aqueous secondary battery adhesive layer comprises a particulate polymer. The disclosed composition for a non-aqueous secondary battery adhesive layer is usually a slurry composition obtained by dispersing a particulate polymer in a solvent such as water and can optionally comprise other components in addition to the particulate polymer.

The disclosed composition for a non-aqueous secondary battery adhesive layer requires that a value of pressure sensitivity of adhesion strength as obtained using the following formula (1) be greater than 20 and less than 80:

$$\text{pressure sensitivity of adhesion strength (N/(m·MPa))} = (T3 - T1)/2 \tag{1}$$

where T1 represents an adhesion strength (N/m) between a polyethylene separator and an adhesive layer for a non-aqueous secondary battery adhesive layer that is obtained using the composition for a non-aqueous secondary battery adhesive layer when the polyethylene separator and the adhesive layer are bonded by pressing at 25° C. and a pressure of 1 MPa for 10 seconds, and T3 represents an adhesion strength (N/m) between the polyethylene separator and the adhesive layer when the polyethylene separator and the adhesive layer are bonded by pressing at 25° C. and a pressure of 3 MPa for 10 seconds.

"Pressure sensitivity of adhesion strength" as obtained using the above formula (1) is a value obtained by dividing an adhesion strength difference (T3−T1) between adhesion strength T3 (N/m) when a polyethylene separator and an adhesive layer for a non-aqueous secondary battery adhesive layer that is obtained using the composition for a non-aqueous secondary battery adhesive layer are bonded by pressing at 25° C. and a pressure of 3 MPa for 10 seconds and adhesion strength T1 (N/m) between the polyethylene separator and the adhesive layer when the polyethylene separator and the adhesive layer are bonded by pressing at 25° C. and a pressure of 1 MPa for 10 seconds, by a difference in pressure between bonding at a pressure of 3

MPa and bonding at a pressure of 1 MPa (3−1=2)). That is, pressure sensitivity of adhesion strength corresponds to a gradient between a pressure of 1 MPa and a pressure of 3 MPa in a graph of adhesion strength versus pressure at the time of pressing, representing the degree of increases in adhesion strength from bonding at a pressure of 1 MPa to bonding at a pressure of 3 MPa.

With the value of pressure sensitivity of adhesion strength of the disclosed composition for a non-aqueous secondary battery adhesive layer being greater than 20 and less than 80, battery members can be firmly bonded to each other by pressing at normal temperature and the non-aqueous secondary battery can exhibit good battery characteristics while ensuring inkjet discharge characteristics. If the above value is 20 or less, it results in failure to discharge the composition by the inkjet method or to secure an adhesion strength when battery members are to be bonded to each other by pressing at normal temperature. On the other hand, if the above value is 80 or more, at the time when the battery is evaluated for durability, the particulate polymer is deformed due to the influence of the internal pressure caused by the bulging of the battery, resulting in the clogging of the separator and thus increased resistance of the battery to cause deterioration of battery characteristics.

The "adhesive layer for a non-aqueous secondary battery" is a dried product of the composition for a non-aqueous secondary battery adhesive layer.

From the viewpoint of simultaneously attaining inkjet discharge characteristics, adhesion between battery members when they are bonded by pressing at normal temperature, and secondary battery characteristics at a high level, the value of pressure sensitivity of adhesion strength is preferably 30 or more, more preferably 40 or more, still more preferably 45 or more, and preferably 70 or less, more preferably 60 or less.

Pressure sensitivity of adhesion strength can be controlled for example by constituting the particulate polymer as a polymer alloy composed of a polymer having a low glass transition temperature and a polymer having a high glass transition temperature; changing the glass transition temperatures of the core and shell of a particulate polymer having a core-shell structure; and/or changing the mass percentage of the shell with respect to the total of the core and shell in the particulate polymer.

<Particulate Polymer>

The particulate polymer contained in the disclosed composition for a non-aqueous secondary battery adhesive layer is a component that functions as a binder in an adhesive layer (adhesive material) for bonding battery members such as separators and electrodes. The particulate polymer used herein can be either a particulate polymer having a core-shell structure or a particulate polymer without a core-shell structure; it is preferable to use at least a particulate polymer having a core-shell structure.

<Particulate Polymer Having Core-Shell Structure>

The particulate polymer having a core-shell structure has a core and a shell covering an outer surface of the core. The use of a particulate polymer having a core-shell structure makes it easy to control the pressure sensitivity of an adhesion strength.

The shell may cover the entire outer surface of the core or may partially cover the outer surface of the core. Even when the outer surface of the core can be seen as being completely covered by the shell externally, the shell is still considered to be a shell that partially covers the outer surface of the core so long as pores are formed that pass through the shell.

FIG. 1 illustrates a cross-sectional structure of an example of a particulate polymer. In FIG. 1, a particulate polymer 300 has a core-shell structure including a core 310 and a shell 320. Here, the core 310 is a portion located more inwardly than the shell 320 in the particulate polymer 300. The shell 320 is a portion that covers an outer surface 310S of the core 310 and normally represents the outermost portion in the particulate polymer 300. In FIG. 1, the shell 320 partially covers the outer surface 310S of the core 310, not covering the entire outer surface 310S of the core 310.

The particulate polymer may include any component other than the core and shell described above so long as expected effects are not significantly impaired. Specifically, the particulate polymer may include inside the core a portion that is formed of a polymer different from that of the core, for example. In one specific example, residual seed particles may be present inside of the core when the particulate polymer is produced by seeded polymerization. However, from the viewpoint of more noticeably allowing expected effects to be exerted, it is preferable that the particulate polymer is composed of only the core and the shell.

[Core]

<Glass Transition Temperature>

The glass transition temperature of the polymer of the core of the particulate polymer is preferably −50° C. or higher, more preferably −45° C. or higher, still more preferably −40° C. or higher, and preferably 25° C. or lower, more preferably 10° C. or lower, still more preferably 0° C. or lower. When the glass transition temperature of the polymer of the core is equal to or higher than the lower limit, inkjet discharge characteristics can be improved. On the other hand, when the glass transition temperature of the polymer of the core is equal to or lower than the upper limit, the polymer of the core can exhibit good adhesion allowing battery members to be more firmly bonded to each other via an adhesive layer even by pressing at normal temperature.

The glass transition temperature of the polymer of the core can be adjusted for example by changing the types and/or percentages of the monomers used for preparing the polymer of the core.

—Chemical Composition—

Examples of monomers used to prepare the polymer of the core include vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinyl amine monomers such as vinyl amine; vinyl amide monomers such as N-vinyl formamide and vinyl acetamide; fluorine-free (meth)acrylic acid ester monomers such as methyl acrylate, ethyl acrylate, butyl acrylate, 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate, and 2-(perfluorobutyl)ethyl acrylate; and maleimide derivatives such as maleimide and phenylmaleimide. One of these monomers may be used alone or two or more of these monomers may be used in combination at any selected ratio.

The term "(meth)acryl" as used herein means acryl and/or methacryl, and the term "(meth)acrylonitrile" as used herein means acrylonitrile and/or methacrylonitrile.

Among these monomers, at least (meth)acrylic acid ester monomers are preferably used as the monomers for preparing the polymer of the core from the viewpoint of further firmly bonding battery members to each other via an adhesive layer, with combinations of (meth)acrylic acid ester monomers and aromatic vinyl monomers or combination of (meth)acrylic acid ester monomers and (meth)acrylonitrile monomers being more preferable, with combinations of (meth)acrylic acid ester monomers and aromatic vinyl monomers being particularly preferable. That is, the polymer of the core preferably comprises at least a (meth)acrylic acid ester monomer unit, more preferably a (meth)acrylic acid ester monomer unit plus an aromatic vinyl monomer unit or a (meth)acrylonitrile monomer unit, and still more preferably a (meth)acrylic acid ester monomer unit and an aromatic vinyl monomer unit.

The phrase "comprise(s) a monomer unit" as used herein means that "a polymer obtained using a monomer comprises a repeating unit derived from that monomer."

The term "(meth)acrylic acid ester monomer" as used herein refers to a monofunctional (meth)acrylic acid ester monomer having only one polymerizable reactive group.

The percentage of the (meth)acrylic acid ester monomer unit in the polymer of the core, when the mass of all repeating units (all monomer units) contained in the polymer of the core is taken as 100% by mass, is preferably 5% by mass or more, more preferably 10% by mass or more, particularly preferably 20% by mass or more, and preferably 80% by mass or less, more preferably 70% by mass or less, from the viewpoint of further firmly bonding battery members to each other via an adhesive material.

In the case where the polymer of the core comprises a (meth)acrylic acid ester monomer unit and an aromatic vinyl monomer unit, the percentage of the aromatic vinyl monomer unit in the polymer of the core, when the mass of all repeating units (all monomer units) contained in the polymer of the core is taken as 100% by mass, is preferably 15% by mass or more, more preferably 20% by mass or more, particularly preferably 25% by mass or more, and preferably 95% by mass or less, more preferably 80% by mass or less, particularly preferably 70% by mass or less, from the viewpoint of further firmly bonding battery members to each other via an adhesive material.

Further, when the polymer of the core comprises a (meth) acrylic acid ester monomer unit and a (meth)acrylonitrile monomer unit, the percentage of the (meth)acrylonitrile monomer unit in the polymer of the core, when the mass of all repeating units (all monomer units) contained in the polymer of the core is taken as 100% by mass, is preferably 5% by mass or more, more preferably 10% by mass or more, particularly preferably 15% by mass or more, and preferably 30% by mass or less, more preferably 25% by mass or less, from the viewpoint of further firmly bonding battery members to each other via an adhesive material.

The polymer of the core may comprise an acid group-containing monomer unit. Examples of acid group-containing monomers include a monomer having an acid group, for example, a monomer having a carboxylic acid group, a monomer having a sulfo group, and a monomer having a phosphate group.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methylvinyl sulfonic acid, (meth)allyl sulfonic acid, (meth)acrylic acid-2-sulfoethyl, 2-acrylamide-2-methyl propane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

The term "(meth)allyl" as used herein means "allyl" and/or "methallyl" and the term "(meth)acryloyl" as used herein mean "acryloyl" and/or "methacryloyl."

Of these acid group-containing monomers, carboxy group-containing monomers are preferable, with monocarboxylic acids being preferable and (meth)acrylic acid being more preferable.

These acid group-containing monomers may be used alone or in combination at any ratio.

The percentage of the acid group-containing unit in the polymer of the core, when the mass of all repeating units (all monomer units) contained in the polymer of the core is taken as 100% by mass, is preferably 0.1% by mass or more, more preferably 1% by mass or more, and preferably 15% by mass or less, more preferably 10% by mass or less. By setting the percentage of the acid group-containing monomer unit to fall within the range described above, it is possible to increase the dispersibility of the core polymer during preparation of the particulate polymer, enabling a shell that partially covers the outer surface of the core to be easily formed on the outer surface of the core polymer.

The polymer of the core preferably comprises a cross-linkable monomer unit in addition to the monomer units described above. A cross-linkable monomer refers to a monomer that can form a cross-linked structure during or after polymerization by heating or by irradiation with energy rays.

Examples of cross-linkable monomers that can be used include polyfunctional monomers having two or more groups that display polymerization reactivity. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers containing an epoxy group, such as allyl glycidyl ether and glycidyl methacrylate; and γ-methacryloxypropyltrimethoxysilane. Among these, di(meth)acrylic acid ester monomers are more preferable. One of these monomers may be used alone or two or more of them may be used in combination at any selected ratio.

The percentage of the cross-linkable monomer unit in the polymer of the core, when the mass of all repeating units (all monomer units) contained in the polymer of the core is taken as 100% by mass, is preferably 0.1% by mass or more, more preferably 0.2% by mass or more, particularly preferably 0.4% by mass or more, and preferably 10% by mass or less, more preferably 5% by mass or less, particularly preferably 3% by mass or less. When the percentage of the cross-linkable monomer unit falls within the above range, battery members can be more firmly bonded to each other via an adhesive layer.

[Shell]

—Glass Transition Temperature—

The glass transition temperature of the polymer of the shell of the particulate polymer is preferably 50° C. or higher, more preferably 53° C. or higher, still more preferably 55° C. or higher, particularly preferably 60° C. or higher, and preferably 200° C. or less, more preferably 120° C. or less, still more preferably 105° C. or less. When the glass transition temperature of the polymer of the shell is equal to or higher than the lower limit, inkjet discharge characteristics can be further improved. On the other hand, when the glass transition temperature of the polymer of the shell is equal to or lower than the upper limit, the particulate polymer becomes moderately soft, so that battery members can be more firmly bonded to each other at normal temperature via an adhesive layer.

The glass transition temperature of the polymer of the shell can be adjusted for example by changing the types and/or percentages of the monomers used for preparing the polymer of the shell.

The glass transition temperature of the polymer of the shell is preferably 25° C. or higher, more preferably 50° C. or higher than the glass transition temperature of the polymer of the core described above, from the viewpoint of maintaining the shape of the particulate polymer after bonding battery members to limit resistance increase.

—Chemical Composition—

Examples of monomers used for preparing the polymer of the shell include the same monomers as those exemplified above as monomers that can be used for preparing the polymer of the core. These monomers may be used alone or in combination at any ratio.

Among such monomers, it is preferable to use at least one of a (meth)acrylic acid ester monomer and an aromatic vinyl monomer, and it is more preferable to use both a (meth) acrylic acid ester monomer and an aromatic vinyl monomer as the monomers for preparing the polymer of the shell, from the viewpoint of further firmly bonding battery members to each other via an adhesive layer. That is, the polymer of the shell preferably comprises at least one of a (meth)acrylic acid ester monomer unit and an aromatic vinyl monomer unit, and more preferably comprises both a (meth)acrylic acid ester monomer unit and an aromatic vinyl monomer unit.

The percentage of the (meth)acrylic acid ester monomer unit in the polymer of the shell, when the mass of all repeating units (all monomer units) contained in the polymer of the shell is taken as 100% by mass, is preferably 10% by mass or more, more preferably 20% by mass or more, still more preferably 32.5% by mass or more, and preferably 90% by mass or less, more preferably 85% by mass or less, from the viewpoint of more firmly bonding battery members to each other via an adhesive layer.

The percentage of the aromatic vinyl monomer unit in the polymer of the shell, when the mass of all repeating units (all monomer units) contained in the polymer of the shell is taken as 100% by mass, is preferably 50% by mass or more, more preferably 65% by mass or more, and preferably 99% by mass or less, more preferably 95% by mass or less, from the viewpoint of further firmly bonding battery members to each other via an adhesive layer.

The polymer of the shell may comprise an acid group-containing monomer unit in addition to the (meth)acrylic acid ester monomer unit and the aromatic vinyl monomer unit. Examples of acid group-containing monomers include monomers having an acid group, e.g., monomers having a carboxylic acid group, monomers having a sulfo group, and monomers having a phosphate group. Specifically, examples of acid group-containing monomers include the same monomers as those exemplified described above as the acid group-containing monomers that can be used to form the core.

Among them, the acid group-containing monomer is preferably a monomer having a carboxylic acid group, more preferably a monocarboxylic acid, still more preferably (meth)acrylic acid.

These acid group-containing monomers may be used alone or in combination at any ratio.

The percentage of the acid group-containing monomer unit in the polymer of the shell, when the mass of all repeating units (all monomer units) contained in the polymer of the shell is taken as 100% by mass, is preferably 0.1% by mass or more, more preferably 0.4% by mass or more, still more preferably 0.7% by mass or more, and preferably 15% by mass or less, more preferably 10% by mass or less, and still more preferably 5% by mass or less. By setting the percentage of the acid group-containing monomer unit within the above range, the dispersibility of the particulate polymer can be improved, whereby battery members can be more firmly bonded to each other via an adhesive layer.

The polymer of the shell may comprise a hydroxyl group-containing monomer unit.

Examples of hydroxyl group-containing monomers capable of forming the hydroxyl group-containing monomer unit of the polymer of the shell include the same monomers as those of hydroxyl group-containing monomers that can be used to form the core.

The percentage of the hydroxyl group-containing monomer unit in the polymer of the shell, when the mass of all repeating units (all monomer units) contained in the polymer of the shell is taken as 100% by mass, is preferably 0.1% by mass or more, more preferably 0.4% by mass or more, still more preferably 0.7% by mass or more, and preferably 15% by mass or less, more preferably 10% by mass or less, still more preferably 5% by mass or less. By setting the percentage of the hydroxyl group-containing monomer unit within the above range, the dispersibility of the particulate polymer can be improved, whereby battery members can be more firmly bonded to each other via an adhesive layer.

The polymer of the shell may comprise a cross-linkable monomer unit. Examples of cross-linkable monomers include the same monomers as those exemplified above as cross-linkable monomers that may be used for preparing the polymer of the core. Among these, di(meth)acrylic acid ester monomers and allyl methacrylate are preferable. These cross-linkable monomers may be used alone or in combination at any ratio.

The percentage of the cross-linkable monomer unit in the polymer of the shell, when the mass of all repeating units (all monomer units) contained in the polymer of the shell is taken as 100% by mass, is preferably 0.05% by mass or more, more preferably 0.1% by mass or more, still more preferably 0.2% by mass or more, and preferably 4% by mass or less, more preferably 3% by mass or less, still more preferably 2% by mass or less.

[Mass Percentage of Shell with Respect to Total of Core and Shell]

In the particulate polymer having a core-shell structure, the mass percentage of the shell with respect to the total of the core and the shell is preferably 2% by mass or more, and preferably 15% by mass or less, more preferably 10% by mass or less. When the mass percentage of the shell is equal to or higher than the lower limit, inkjet discharge characteristics can be further improved. When the mass percentage of the shell is equal to or less than the upper limit, battery members can be more firmly bonded to each other by pressing at normal temperature, and a secondary battery can exhibit better battery characteristics.

Here, the mass percentage of the shell with respect to the total of the core and the shell is obtained from the thickness ratio of the core and the shell to be described later and the specific gravity of the particulate polymer.

[Volume-Average Particle Diameter of Particulate Polymer Having Core-Shell Structure]

The volume-average particle diameter of the particulate polymer having a core-shell structure is preferably 100 nm or more, more preferably 200 nm or more, and preferably 1,500 nm or less, more preferably 900 nm or less, still more preferably 800 nm or less, even more preferably 700 nm or less. When the volume-average particle diameter of the particulate polymer having a core-shell structure is 100 nm or more, deterioration of battery characteristics due to resistance increases in the secondary battery caused by inhibition of the passage of lithium ions through the substrate (electrode or separator) can be limited. When the volume-average particle diameter 1,500 nm or less, clogging of nozzles when the composition for a non-aqueous secondary battery adhesive layer is applied by the inkjet method can be further limited, thus improving inkjet discharge characteristics.

[Percentage of Average Thickness of Shell with Respect to Volume-Average Particle Diameter]

The percentage of the average thickness of the shell with respect to the volume-average particle diameter of the particulate polymer having a core-shell structure is preferably 0.1% or more, more preferably 0.5% or more, and preferably 15% or less, more preferably 10% or less. When the percentage of the average thickness of the shell is equal to or greater than the lower limit, inkjet discharge characteristics can be further improved. When the percentage of the average thickness of the shell is equal to or less than the upper limit, battery members can be more firmly bonded to each other when the battery members are pressed at normal temperature.

Here, the average thickness of the shell of the particulate polymer having a core-shell structure is obtained by observing a cross-sectional structure of the particulate polymer having a core-shell structure by transmission electron microscopy (TEM). Specifically, a maximum thickness of the shell in a cross-sectional structure of the particulate polymer is measured by TEM and an average of the maximum thicknesses of the shells of 20 or more random particulate polymers is defined as the average thickness of the shell. When the shell is composed of polymer particles and the particles constituting the shell do not overlap each other in the radial direction of the particulate polymer particle so that the polymer particles constitute a single-layer shell, the number-average particle diameter of the particles constituting the shell is defined as the average thickness of the shell.

[Method for Preparing Particulate Polymer Having Core-Shell Structure>

The particulate polymer having a core-shell described above can be prepared for example by stepwise polymerization in which monomers for preparing the core polymer and monomers for preparing the shell polymer are used at varying ratios over time. Specifically, the particulate polymer can be prepared by continuous, multi-step emulsion polymerization or multi-step suspension polymerization in which a polymer of a preceding step is sequentially covered by a polymer of a succeeding step.

The following describes one example of a case in which the particulate polymer having a core-shell structure described above is obtained by multi-step emulsion polymerization.

Upon polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride can be used as a polymerization initiator, for example.

The polymerization procedure involves initially mixing one or more monomers for forming the core and an emulsifier, and then performing emulsion polymerization as one batch to obtain a particulate polymer that forms the core. The particulate polymer having a core-shell structure set forth above can then be obtained by performing polymerization of monomers for forming the shell in the presence of the particulate polymer forming the core.

In the case of preparing a particulate polymer in which a shell partially covers the outer surface of the core, it is preferable that the monomer forming the polymer of the shell is supplied to the polymerization system in a plurality of divided portions or continuously. As a result of the monomers for forming the polymer of the shell being supplied into the polymerization system in portions or continuously, the polymer forming the shell can be formed as particles that bond to the core such as to form a shell that partially covers the core.

<<Particulate Polymer without Core-Shell Structure>>

[Glass Transition Temperature]

The glass transition temperature of the particulate polymer without a core-shell structure is preferably −40° C. or higher, more preferably −35° C. or higher, still more preferably −30° C. or higher, and preferably 0° C. or lower, more preferably −10° C. or lower, still more preferably −20° C. or lower. When the glass transition temperature of the particulate polymer without a core-shell structure is −40° C. or higher, battery members can be more firmly bonded to each other via an adhesive material. On the other hand, when the glass transition temperature of the particulate polymer without a core-shell structure is 0° C. or lower, it is possible to prevent the particulate polymer from falling off the substrate.

[Chemical Composition]

Examples of monomers used for preparing the particulate polymer without a core-shell structure include the same monomers as those exemplified as monomers that can be used for preparing the polymer of the core of the particulate polymer having a core-shell structure described above. For example, as the monomers used for preparing the particulate polymer without a core-shell structure, (meth)acrylic acid ester monomers, aromatic vinyl monomers, acid group-containing monomers, cross-linkable monomers, and the like are preferably used. These monomers may be used alone or in combination at any ratio.

The percentage of the (meth)acrylic acid ester monomer unit in the particulate polymer without a core-shell structure, when the mass of all repeating units (all monomer units) contained in the polymer is taken as 100% by mass, is preferably 40% by mass or more, more preferably 50% by mass or more, still more preferably 60% by mass or more, and preferably 85% by mass or less, more preferably 80% by mass or less, still more preferably 75% by mass or less, from the viewpoint of further firmly bonding battery members to each other via an adhesive layer.

The percentage of the aromatic vinyl monomer unit in the particulate polymer without a core-shell structure, when the mass of all repeating units (all monomer units) contained in the polymer is taken as 100% by mass, is preferably 10% by mass or more, more preferably 15% by mass or more, still more preferably 20% by mass or more, and preferably 40% by mass or less, more preferably 35% by mass or less, still more preferably 30% by mass or less, from the viewpoint of further firmly bonding battery members to each other via an adhesive layer.

The percentage of the acid group-containing monomer unit in the particulate polymer without a core-shell structure, when the mass of all repeating units (all monomer units) contained in the polymer is taken as 100% by mass, is preferably 0.5% by mass or more, more preferably 1% by mass or more, still more preferably 2% by mass or more, and preferably 10% by mass or less, more preferably 7% by mass or less, still more preferably 5% by mass or less. By setting the percentage of the acid group-containing unit in the particulate polymer without a core-shell structure within the above range, the dispersibility of the particulate polymer can be enhanced.

The percentage of the cross-linkable monomer unit in the particulate polymer without a core-shell structure, when the mass of all repeating units (all monomer units) contained in the polymer is taken as 100% by mass, is preferably 0.2% by mass or more, more preferably 0.5% by mass or more, still more preferably 1% by mass or more, and preferably 5% by mass or less, more preferably 4% by mass or less, still more preferably 3% by mass or less, from the viewpoint of further firmly bonding battery members to each other via an adhesive layer.

[Volume-Average Particle Diameter of Particulate Polymer without Core-Shell Structure]

The volume-average particle diameter of the particulate polymer without a core-shell structure is preferably 50 nm or more, more preferably 100 nm or more, still more preferably 200 nm or more, and preferably 600 nm or less, more preferably 500 nm or less, still more preferably 400 nm or less. When the volume-average particle diameter of the particulate polymer without a core-shell structure is within the above predetermined range, battery members can be more firmly bonded to each other via an adhesive material.

[Amount of Particulate Polymer without Core-Shell Structure]

The amount of the particulate polymer without a core-shell structure in the composition for an adhesive layer can be appropriately adjusted within a range in which the desired effects of the present disclosure can be obtained, but is preferably 5 parts by mass or more, and more preferably 10 parts by mass or more, per 100 parts by mass of the particulate polymer having a core-shell structure. When the amount of the particulate polymer without a core-shell structure is equal to or higher than the above lower limit, it is possible to prevent the particulate polymer from falling off the substrate.

[Method for Producing Particulate Polymer without Core-Shell Structure]

Methods for producing the particulate polymer without a core-shell structure are not particularly limited and the particulate polymer can be prepared for example by polymerizing a monomer composition containing the above-described monomers in an aqueous solvent such as water. The percentages of monomers in the monomer composition are generally the same as those of the corresponding monomer units in the particulate polymer without a core-shell structure. The polymerization method and the polymerization reaction are not particularly limited and known polymerization methods and polymerization reactions can be used.

<<Degree of Swelling in Electrolyte Solution>>

The degree of swelling in electrolyte solution (1 mol/L $LiPF_6$ solution in 3:7 (volume ratio) mixed solvent of ethylene carbonate and diethyl carbonate) of the particulate polymer (hereinafter, sometimes simply referred to as "degree of swelling" of the particulate polymer) is not particularly limited. However, the particulate polymer is preferably insoluble in the electrolyte solution. When the particulate polymer is dissolved, there is a concern that battery characteristics deteriorate.

The degree of swelling of the particulate polymer can be measured by the method described in Examples section of the present specification.

<Solvent>

Solvents for dispersing the particulate polymer therein are not particularly limited. For example, water, organic solvents, and mixtures thereof can be used. Examples of organic solvents include, but are not limited to, cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, propylene glycol, and ethylene glycol monomethyl ether.

Among the above, it is preferable to use water from the viewpoint of simplifying the facility.

At least part of the above-described solvent may be removed by drying or the like during the production process of a laminate for a non-aqueous secondary battery.

<Other Components>

Other components optionally included in the disclosed composition for a non-aqueous secondary battery adhesive layer are not particularly limited, and examples thereof include surface tension modifiers, dispersants different from those used in the polymerization described above, viscosity modifiers, reinforcing materials, and additives for electrolyte solution. These other components are not specifically limited so long as they do not affect the battery reactions and may be selected from commonly known components such as those described in WO2012/115096A1. These additional components may be used alone or in combination at any ratio.

<Method for Preparing Composition for Non-Aqueous Secondary Battery Adhesive Layer>

Methods for preparing the disclosed composition for a non-aqueous secondary battery adhesive layer are not particularly limited. The disclosed composition for a non-aqueous secondary battery adhesive layer can be prepared for example by stirring and mixing a particulate polymer and other components in the presence of a solvent. Here, the stirring and mixing can be performed by any methods known in the art using, for example, a general mixing container, a ball mill, a sand mill, a bead mill, a pigment disperser, an ultrasonic disperser, a grinding machine, a homogenizer, a planetary mixer, FILMIX or the like. Mixing conditions are not particularly limited. Mixing can be performed at a temperature in the range of normal temperature to 80° C. for 10 minutes to several hours.

Adhesive Layer for Non-Aqueous Secondary Battery

The disclosed adhesive layer for a non-aqueous secondary battery is obtained by using the disclosed composition for a non-aqueous secondary battery adhesive layer. Further, the disclosed adhesive layer for a non-aqueous secondary battery functions as an adhesive material for bonding together battery members used in a non-aqueous secondary battery. The disclosed adhesive layer for a non-aqueous secondary battery can be obtained for example by the disclosed method for producing an adhesive layer for a non-aqueous secondary battery to be described later.

The disclosed adhesive layer for a non-aqueous secondary battery is a dried product obtained by drying the disclosed composition for a non-aqueous secondary battery adhesive layer. As such, the disclosed adhesive layer for a non-aqueous secondary battery comprises at least the above-described particulate polymer, and optionally comprises the above-described other components.

The particulate polymer is present in a particulate form in the composition for a non-aqueous secondary battery adhesive layer. The particulate polymer may be in a particulate form or other form in the adhesive layer for a non-aqueous secondary battery.

The shape of the adhesive layer is not particularly limited and may be formed to have any shape in plan view, such as stripe shape, dot shape, or lattice shape. In particular, from the viewpoint of reducing the resistance of the secondary battery, the adhesive layer is preferably formed in a dot shape. The dot-like adhesive layer can be obtained, for example, by the inkjet method using coaters (see reference signs 51 to 54 in FIG. 2) described later.

The diameter of the dots of the adhesive layer arranged in a dot-like pattern is preferably 10 μm or more, more preferably 20 μm or more, and preferably 300 μm or less, more preferably 200 μm or less. When the diameter of the dots of the adhesive layer is equal to or larger than the lower limit, adhesion between an electrode and a separator can be increased. On the other hand, when the diameter of the dots of the adhesive layer is equal to or smaller than the upper limit, it is possible to limit deterioration in the output characteristics of the secondary battery.

The thickness of the dots of the adhesive layer arranged in a dot-like pattern is preferably 5 μm or more. When the thickness of the dots of the adhesive layer is equal to or greater than the lower limit, adhesion between an electrode and a separator can be increased.

The basis weight of the adhesive layers is preferably 0.02 $g/m^2$ or more, and preferably 1.0 $g/m^2$ or less, more preferably 0.35 $g/m^2$ or less. When the basis weight of the adhesive layer is equal to or greater than the lower limit, adhesion between an electrode and a separator can be sufficiently secured. When the basis weight of the adhesive layer is equal to or less than the upper limit, the output characteristics of the secondary battery can be secured sufficiently high.

The coverage of the adhesive layer is preferably 1% or more, more preferably 5% or more, and preferably 50% or less, more preferably 30% or less. When the coverage of the adhesive layer is equal to or higher than the lower limit, adhesion between an electrode and a separator can be secured. When the coverage of the adhesive layer is equal to or lower than the upper limit, the output characteristics of the secondary battery can be secured sufficiently high.

"Coverage of the adhesive layer" in a certain surface or region refers to the ratio of the area of a portion covered with the adhesive layer to the entire area of the surface or region: [(area of portion covered with adhesive layer/area of entire surface or region)×100 (%)].

When the composition for an adhesive layer containing a particulate polymer and a solvent is used, the "adhesive layer" in the "coverage of the adhesive layer" refers to a dried product of the composition for an adhesive layer.

The coverage of the adhesive layer can be adjusted by changing the pattern of the arrangement of the adhesive layer disposed (applied) in the respective regions. Specifically, in a case where an adhesive layer is disposed (applied) so as to form a dot-like pattern in a certain area, the coverage ratio of the adhesive layer in the region can be adjusted by changing the radius of, and the distance between the centers of, the dots of the adhesive layer. For example, in a region where the adhesive layer is disposed (applied) in a dot-like pattern in which dots are formed at regular intervals in two orthogonal directions, the coverage of the adhesive layer can be obtained using the following formula (2) using the center-to-center distances (pitches) x and y of the dots and the radius r of the dots:

$$\text{Coverage of adhesive layer} = \{\pi r^2/(x \cdot y)\} \times 100(\%). \qquad (2)$$

Method for Producing Adhesive Layer for Non-Aqueous Secondary Battery

The disclosed method for producing an adhesive layer for a non-aqueous secondary battery includes: applying the disclosed composition for a non-aqueous secondary battery adhesive layer on a surface of a substrate by the inkjet method (applying step); and drying the composition applied on the substrate (drying step). In addition, the disclosed method for producing an adhesive layer for a non-aqueous secondary battery may include removing the adhesive layer for a non-aqueous secondary battery formed on the substrate after the drying step (removing step).

In the case where the adhesive layer for a non-aqueous secondary battery is formed on an electrode substrate or a separator substrate, the electrode substrate and the separator substrate can be bonded as they are to form a laminate. Further, in the case where the adhesive layer for a non-aqueous secondary battery is formed on a releasable substrate, the adhesive layer can be used for adhesion between an electrode substrate and a separator substrate after removing the adhesive layer from the releasable substrate.

<Applying Step>

In the applying step, droplets of the disclosed composition for a non-aqueous secondary battery adhesive layer are applied on a substrate such as an electrode substrate, a separator substrate, or a releasable substrate via nozzles of an inkjet type coater. As the inkjet type coater, any of those known in the art can be used, and application can be accomplished using, for example, coaters (reference signs 51 to 54 in FIG. 2) described later. From the viewpoint of manufacturing efficiency, it is preferable that the composition for a non-aqueous secondary battery adhesive layer is applied on an electrode substrate or a separator substrate, and from the viewpoint of facilitating the drying step, it is preferable that the composition for a non-aqueous secondary battery adhesive layer is applied on an electrode substrate.

Coating conditions by the inkjet method are not particularly limited as long as the composition for a non-aqueous secondary battery adhesive layer can be applied on a substrate. Coating conditions can be appropriately adjusted depending on the desired form of the resulting adhesive layer (shape in plan view, dot diameter, dot depth, dot pitch, coverage, basis weight etc.).

<<Electrode Substrate>>

The electrode substrate is not particularly limited, and a known electrode substrate can be used. For example, electrode substrates usable herein can be an electrode made of an electrode substrate formed by forming an electrode mixed material layer on one or both sides of a current collector, or an electrode made by further forming a porous film layer on an electrode mixed material layer of an electrode substrate.

The current collector, electrode mixed material layer, and porous film layer are not specifically limited and can be any current collector, electrode mixed material layer, and porous membrane layer that can be used in the field of secondary batteries, such as any of those described in JP2013-145763A.

<<Separator Substrate>>

The separator substrate is not particularly limited, and a known separator substrate such as an organic separator substrate can be used. The organic separator substrate is a porous member made of organic material. Examples of the organic separator substrate include a microporous film or a nonwoven fabric, which contains a polyolefin resin such as polyethylene or polypropylene, an aromatic polyamide resin, and the like. A microporous film or a nonwoven fabric made of polyethylene is preferable because of its excellent strength. From the viewpoint of safety, a heat-resistant separator in which a ceramic is applied on the separator described above is preferable.

Further, the separator substrate may have a porous film layer formed on one or both sides thereof. The porous membrane layer refers to a layer containing non-conductive particles such as that described for example in JP2013-145763A.

<<Releasable Substrate>>

The releasable substrate is not particularly limited, and those known in the art can be used.

<Drying Step>

In the drying step, the composition for an adhesive layer applied on the substrate is dried to form on the substrate an adhesive layer formed of a dry product of the composition. The drying method is not particularly limited, and those known in the art can be used. Examples of drying methods include drying methods using a heating device such as a heater, a dryer, or a heat roller. The drying condition is not particularly limited, but the drying temperature is preferably 50° C. or higher and 90° C. or lower, and the drying time is preferably 1 second or more and 120 seconds or less.

<Removing Step>

In the removing step, the adhesive layer for a non-aqueous secondary battery formed on the substrate is removed. When the adhesive layer for a non-aqueous secondary battery is formed on a releasable substrate, the adhesive layer can be removed from the releasable substrate for subsequent use for the production of a laminate for a non-aqueous secondary battery to be described later.

Laminate for Non-Aqueous Secondary Battery

The disclosed laminate for a non-aqueous secondary battery is a laminate for a non-aqueous secondary battery, which comprises an electrode and a separator, wherein the electrode and the separator are bonded to each other via the disclosed adhesive layer for a non-aqueous secondary battery described above. The electrode(s) to be bonded to the separator to constitute the laminate for a secondary non-aqueous second battery may be a negative electrode, a positive electrode, or both. In the case where both a positive electrode and a negative electrode are bonded to a separator to form a laminate for a non-aqueous secondary battery, the number of each of the positive electrodes, negative electrodes, and separators included in the laminate may be one or two or more, respectively. That is, the disclosed laminate for a non-aqueous secondary battery may have any of the following structures (1) to (6):

(1) Positive electrode/Separator;
(2) Negative electrode/Separator;
(3) Positive electrode/Separator/Negative electrode;
(4) Positive electrode/Separator/Negative electrode/Separator;
(5) Separator/Positive electrode/Separator/Negative electrode; and
(6) Structure in which positive and negative electrodes are stacked alternately with separators in-between (e.g., Separator/Negative electrode/Separator/Positive Electrode/Separator/Negative electrode . . . /Separator/Positive electrode)

<Electrodes>

The electrodes are not particularly limited and those known in the art can be used. For example, the electrodes described in the section titled "Method for Producing Adhesive Layer for Non-aqueous Secondary Battery" above can be used.

<Separators>

The separators are not particularly limited, and those known in the art can be used. For example, the separators described in the section titled "Method for Producing Adhesive Layer for Non-Aqueous Secondary Battery" above can be used.

<Adhesive Layer>

As described above, the adhesive layer for bonding an electrode and a separator is a dried product of the disclosed composition for a non-aqueous secondary battery adhesive layer. That is, the dried product includes at least a polymer derived from the particulate polymer, and optionally includes other components described above.

The preferred forms of the adhesive layer (e.g., dot diameter, dot depth, dot pitch, coverage, basis weight) are the same as those described in the section titled <Adhesive Layer for Non-Aqueous Secondary Battery>.

The particulate polymer is present in a particle shape in the composition for a non-aqueous secondary battery adhesive layer. The particulate polymer may be in a particle shape or other shape in the adhesive layer for a non-aqueous secondary battery in the laminate.

Method for Producing Laminate for Non-Aqueous Secondary Battery

The disclosed method for producing a laminate for a non-aqueous secondary battery includes: supplying an adhesive material to a bonding surface (i.e., a surface on which the adhesive material (adhesive layer) is to be formed) of at least one of an electrode and a separator (supplying step); and bonding the electrode and the separator via the bonding surface supplied with the adhesive material by pressing at normal temperature (bonding step). The disclosed method for producing a laminate for a non-aqueous secondary battery may further include, after the bonding step, cutting the obtained laminated body (cutting step).

<Supplying Step>

In the supplying step, the adhesive material is supplied to a bonding surface of at least one of an electrode (positive electrode, negative electrode) and a separator. The adhesive material can be supplied by applying the disclosed composition for a non-aqueous secondary battery adhesive layer by the inkjet method and drying the applied composition. Alternatively, the adhesive material may be supplied by transferring (laminating) an adhesive layer for a non-aqueous secondary battery, removed from a releasable substrate as described above, onto the bonding surface.

The conditions for the inkjet method are not particularly limited as long as the composition for a non-aqueous secondary battery adhesive layer can be applied and can be adjusted as appropriate according to the desired configuration of the resulting adhesive material (e.g., shape in plan view, dot diameter, dot thickness, dot pitch, coverage, basis weight, etc.).

When the composition for a non-aqueous secondary battery adhesive layer is applied by the inkjet method, the composition may be dried during conveyance while an electrode and a separator are conveyed to a bonding start position without bringing other members into contact with the bonding surface to which the composition has been supplied. When other members are not brought into contact with the bonding surface to which the composition has been supplied, blocking and other problems do not occur, making it possible to efficiently produce a laminate for a non-aqueous secondary battery. When an adhesive layer for a non-aqueous secondary battery removed from a releasable substrate is supplied, drying does not need to be performed.

The term "bonding start position" as used herein refers to a position at which a bonding surface of an electrode and a bonding surface of a separator are brought into contact with each other when the electrode and the separator are bonded to each other.

Conveyance of an electrode and a separator can be performed using any conveying mechanism such as, for example, a roller, a belt conveyor, a manipulator, or a suction band. Of these examples, it is preferable that at least one of an electrode and a separator is conveyed using a roller from the viewpoint of further increasing the production efficiency of the laminate for a secondary battery.

Drying of the composition for a non-aqueous secondary battery adhesive layer can be performed by any means such as, for example, a heating device such as a heater, a dryer, or a heat roller. The drying temperature of the electrode and/or the separator to which the composition for a non-aqueous secondary battery adhesive layer has been supplied is not particularly limited and is preferably 50° C. or higher and 90° C. or lower. The drying time is not particularly limited and is preferably 1 second or more and 120 seconds or less.

<Bonding Step>

In the bonding step, the electrode and the separator are bonded to each other via the bonding surface. Bonding is performed by pressing at normal temperature a laminate of the electrode and the separator, which are laminated on top of each other via the bonding surface.

The pressure at which the laminate is pressed can be appropriately adjusted according to the type and amount of the particulate polymer to be used. The pressure is preferably greater than 1 MPa and 5 MPa or less.

<Cutting Step>

The cutting step is a step in which the laminated body obtained in the bonding step to a desired size. Cutting can be accomplished by any cutting machine that can be used in the field of manufacturing a secondary battery, e.g., a cutting machine that cuts the laminated body using a cutting blade with the laminated body being sandwiched from both sides in its thickness direction.

<Electrode and Separator>

The electrodes and separators are not particularly limited and those known in the art can be used. For example, the electrodes and the separators described above in the section titled "Method for Producing Adhesive Layer for Non-aqueous Secondary Battery" can be used.

<Adhesive Material>

The adhesive material for bonding an electrode and a separator is a dried product of the composition for an adhesive layer for a non-aqueous disclosed secondary battery. That is, the dried product includes at least a polymer derived from the particulate polymer, and optionally includes other components described above.

The preferred forms of the adhesive material (e.g., dot diameter, dot depth, dot pitch, coverage, basis weight) are the same as those described in the section titled <Adhesive Layer for Non-Aqueous Secondary Battery>.

The particulate polymer is present in a particle shape in the composition for a non-aqueous secondary battery adhesive layer. The particulate polymer may be in a particle shape or other shape in the adhesive layer for a non-aqueous secondary battery in the laminate after pressing.

Hereinafter, an example of a production process of the disclosed laminate for a non-aqueous secondary battery will be described with reference to FIG. 2.

Figure 2:
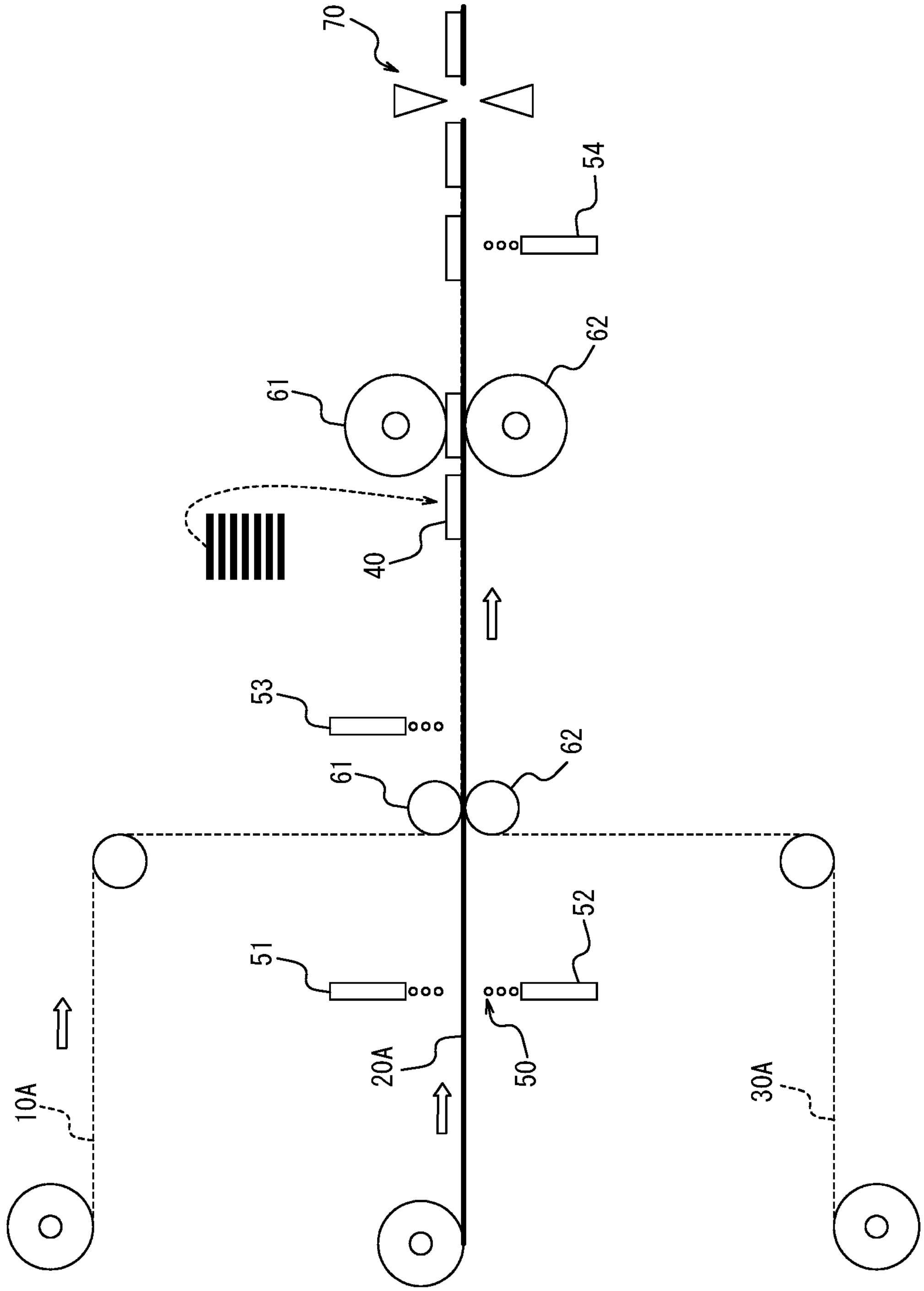
FIG. 2 is an illustration for explaining an example of a production process of the disclosed laminate for a non-aqueous secondary battery.

Referring to FIG. 2, an elongated first separator web 10A, fed from a roll of a first separator web, is bonded to one side of a negative electrode material formed of an elongated negative electrode web 20A fed from a roll of a negative electrode web via an adhesive material supplied from a coater 51. At the same time, an elongated second separator web 30A, fed out from a roll of a second separator web, is bonded to the other side of the negative electrode material formed of the elongated negative electrode web 20A via an adhesive material supplied from a coater 52. Note that bonding can be accomplished using, for example, press rollers 61 and 62. Then, a positive electrode 40 is bonded to a surface of the first separator web 10A, opposite to the negative electrode web 20A side, at a predetermined pitch via an adhesive material supplied from a coater 53 to form a laminated body having a positive electrode. In FIG. 2, the process is so designed that an adhesive material is supplied from a coater 54 to a surface of the second separator web 30A, opposite to the negative electrode web 20A side, so that laminates, each of which is obtained by cutting a laminated body at positions between positive electrodes 40 adjacent to each other in the longitudinal direction, are well bonded to one another when the laminates are stacked on top of one another to form a stack.

Using a cutting machine 70, the laminated body is then cut to provide a laminate.

Non-Aqueous Secondary Battery

The disclosed non-aqueous secondary battery comprises the disclosed laminate for a non-aqueous secondary battery. The disclosed non-aqueous secondary battery comprises, for example, electrodes (positive and negative electrodes), an electrolyte solution, and a separator. At least one of the positive and negative electrodes, and the separator are bonded together via the disclosed adhesive layer for a non-aqueous secondary battery to form the disclosed laminate for a non-aqueous secondary battery. Since the disclosed non-aqueous secondary battery includes the disclosed laminate for a non-aqueous secondary battery, the non-aqueous secondary battery can exhibit good battery characteristics.

<Electrodes>

The electrodes used in the disclosed secondary battery are not limited, and those known in the art can be used. For example, the electrodes described in the section titled "Method for Manufacturing Adhesive Layer for Non-aqueous Secondary Battery" can be used.

<Separator>

The separator used in the disclosed secondary battery is not limited, and those known in the art can be used. For example, the separators described in the section titled "Method for Manufacturing Adhesive Layer for Non-aqueous Secondary Battery" can be used.

<Electrolyte Solution>

As the electrolyte solution used in the disclosed secondary battery, an organic electrolyte solution in which a supporting electrolyte is dissolved in an organic solvent is usually used. For example, when the non-aqueous secondary battery is a lithium-ion secondary battery, a lithium salt is used as the supporting electrolyte. Examples of lithium-salts include $LiPF_6$, $LiAsF_6$, $LiBF_4$, Li $SbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SOOOA)NLi$, and the like. Among them, $LiPF_6$, $LiClO_4$, and $CF_3SO_3Li$ are preferred, with $LiPF_6$ being particularly preferred because it is soluble in solvent and exhibits a higher degree of dissociation. One electrolyte may be used individually, or two or more electrolytes may be used in combination at any selected ratio. In general, lithium ion conductivity tends to increase when a supporting electrolyte having a high degree of dissociation is used. Therefore, lithium ion conductivity can be adjusted through the type of supporting electrolyte that is used.

Any organic solvent that can dissolve the supporting electrolyte can be used as the organic solvent in the electrolyte solution. Preferred examples include carbonates such as dimethyl carbonate (DMC), ethylene carbonate (EC), diethyl carbonate (DEC), propylene carbonate (PC), butylene carbonate (BC), and ethylmethyl carbonate (EMC); esters such as g-butyrolactone and methyl formate; ethers such as 1,2-dimethoxyethane and tetrahydrofuran; and sulfur-containing compounds such as sulfolane and dimethyl sulfoxide." Furthermore, a mixed liquid of such solvents may be used. Of these solvents, carbonates are preferable for their high dielectric constant and broad stable potential region, and a mixture of ethylene carbonate and ethyl methyl carbonate is more preferable.

Moreover, known additives such as vinylene carbonate (VC), fluoroethylene carbonate (FEC) and/or ethyl methyl sulfone may be added to the electrolyte solution.

<Method for Producing Secondary Battery>

The disclosed secondary battery can be produced for example by placing a stack of laminates into a device container (battery container) after, for example, winding or folding the stack according to the battery shape as necessary, and injecting an electrolyte solution into the device container to seal the stack therein. Note that the stack may be a laminate itself or may be a plurality of laminates. In addition, the stack may be manufactured by stacking the laminate and additional battery member(s) (such as an electrode and/or a separator). In addition, the disclosed secondary battery may be provided with an overcurrent preventing device such as a fuse or a PTC element, an expanded metal, a lead plate, or the like, as needed, in order to prevent an increase in pressure, an overcharge/discharge, or the like. The shape of the secondary battery may be a coin type, button type, sheet type, cylinder type, prismatic type, flat type, or the like.

EXAMPLES

The following provides a more specific description of the present disclosure based on Examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the percentage constituted by a monomer unit in the polymer that is formed through polymerization of a given monomer is normally, unless otherwise specified, the same as the ratio (charging ratio) of the given monomer among all monomers used in polymerization of the polymer.

Various measurements and evaluations in Examples and Comparative Examples were performed by the methods described below.

Glass Transition Temperature

An aqueous dispersion of a particulate polymer prepared in each Production Example was dried at a temperature of 130° C. for 1 hour to prepare a sample. With 10 mg of the sample weighed into an aluminum pan, measurement was made using a differential thermal analyzer ("EXSTAR DSC6220" manufactured by SII Nanotechnology Co., Ltd.) in the measurement temperature range of −100° C. to 200° C. at a temperature rise rate of 10° C./min under the conditions defined in JIS Z8703, to obtain a differential scanning calorimetry (DSC) curve. Note that an empty aluminum pan was used as a reference. The glass transition temperature was determined from the point of intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak in this heating step.

Volume-Average Particle Diameter

The volume-average particle diameter of the particulate polymer prepared in each Production Example was measured by the laser diffraction method. Specifically, using an aqueous dispersion containing the prepared particulate polymer (solid content concentration: 0.1% by mass) as a sample, a volume-based particle size distribution was obtained by a laser diffraction-type particle size analyzer ("LS-13 320" manufactured by Beckman Coulter Co., Ltd.). The particle diameter at which the cumulative volume calculated from the small diameter side amounts to 50% in the particle size distribution was determined and defined as a volume-average particle diameter D50 (nm).

Degree of Swelling in Electrolyte Solution

The aqueous dispersion of the particulate polymer prepared in each Production Example was dried, and about 0.2 g of the obtained dried product was pressed at 200° C. for 2 minutes at a pressure of 5 MPa to form a film. The film was cut to a size of 1 cm×1 cm to prepare a test sample. Weight W2 (g) of the test sample was measured. The sample was then immersed in electrolyte solution (solution obtained by dissolving $LiPF_6$ in 3:7 (volume ratio) mixed solvent of ethylene carbonate and diethyl carbonate at a concentration of 1 mol/L) at 60° C. for 72 hours. Thereafter, the sample was removed from the electrolyte solution, the mixed solvent on the surface was wiped off, and weight W3 (g) of the sample was measured. The degree of swelling (%) was then calculated using the following formula:

$$\text{Degree of swelling in electrolyte solution (\%)} = W3/W2 \times 100$$

Basis Weight of Adhesive Layer

The basis weight of the adhesive layer was determined from the mass difference per unit area between before the adhesive layer composition was supplied on the substrate and after the adhesive layer composition was supplied and dried on the substrate.

Coverage of Adhesive Layer

A laser microscope (VR-3100, manufactured by Keyence, Inc.,) was used to measure the center-to-center distances (pitches) x and y of the dots and the radii r of the dots in region where the adhesive material was placed (deposited) in a dot-like pattern. Using these values, the coverage of the adhesive layer was determined using the following formula (2):

$$\text{Coverage of adhesive layer} = \{\pi r^2/(x \cdot y)\} \times 100(\%). \quad (2)$$

Pressure Sensitivity of Adhesion Strength

On a rough surface of a PET substrate (polyester film PTHA-25, manufactured by UNITIKA, Ltd.), the composition for a non-aqueous secondary battery adhesive layer prepared in Example or Comparative Example was applied with a bar coater and dried at 50° C. for 2 minutes to form a thin layer having a basis weight after drying of 4 to 5 g/m$^2$ on the PET substrate. The PET substrate with the thin layer was punched to a size of 10 mm×50 mm, placed onto a PE separator ("ND412," manufactured by Asahi Kasei Corporation, surface roughness Sa: 0.10 μm to 0.20 μm) cut to a size of 25 mm×60 mm, and subjected to pressing using a precision press machine at a temperature of 25° C. and a pressure of 1 MPa for 10 seconds to form an evaluation sample. Using a double-sided adhesive tape, the PE separator-side of the sample was affixed to a stage of a peel test device (load cell), and the PET substrate was pulled at a rate of 50 mm/min at a peel angle of 90° to measure peel strength. Peel strength was also measured in the same manner for an evaluation sample subjected to precision pressing performed at a temperature of 25° C. and a pressure of 3 MPa for 10 seconds. The value obtained by dividing the difference in peel strength between pressing at a pressure of 3 MPa and pressing at a pressure of 1 MPa by 2 was taken as "pressure sensitivity."

Inkjet Discharge Characteristics

The composition for a non-aqueous secondary battery adhesive layer prepared in Example and Comparative Example was subjected to a discharge test using a high-performance head-mounted discharge test kit (IJK-2005, manufactured by Microjet Co., Ltd.). Discharge characteristics were evaluated based on the following criteria:

A: Discharging is possible and also re-discharging is possible even when the composition is allowed to stand for 5 minutes or more.
B: Discharging is possible but re-discharging is not possible when the composition is allowed to stand for 5 minutes
C: Discharging is not possible

Adhesion Between Electrode and Separator

Under the same conditions as in Examples and Comparative Examples, a negative electrode coated with an adhesive layer (adhesive material) on one side and a separator were pressed at 25° C. and at a pressure of 2 MPa for 10 seconds. The laminate after bonding (i.e., a laminate in which one negative electrode and one separator are bonded to each other via an adhesive material) was recovered for use as a test sample.

An adhesive cellophane tape was attached to the current collector side of the negative electrode of the sample with the current collector side facing downward. An adhesive cellophane tape in accordance with JIS Z1522 was used. The adhesive cellophane tape was previously affixed to a horizontal test stage. The stress when the separator was peeled off by pulling one end of the separator vertically upward at a pulling rate of 50 mm/min was measured.

This measurement was performed six times in total, and the average value of stress was taken as peel strength. Adhesion between the negative electrode and separator was then evaluated on the basis of the criteria given below. The higher the peel strength, the higher the adhesion between the electrode (negative electrode) and separator.

A: Peel strength is 5.0 N/m or more
B: Peel strength is 3.0 N/m or more and less than 5.0 N/m
C: Peel strength is 1.0 N/m or more and less than 3.0 N/m
D: Peel strength is 0.5 N/m or more and less than 1.0 N/m
E: Peel strength is less than 0.5 N/m

Lithium Deposition Ratio on Negative Electrode Surface

The produced lithium-ion secondary battery was fully charged to a SOC of 100% at a constant current of 1 C at a temperature of −10° C. The fully charged secondary battery was disassembled to remove the negative electrode, and the surface state of the negative electrode mixed material layer of the negative electrode was inspected. Then, the area of lithium deposited on the surface of the negative electrode mixed material layer was measured, and the lithium deposition ratio on the surface of the negative electrode=(area of deposited lithium/area of surface of negative electrode mixed material layer)×100(%) was calculated. Evaluation was performed by the criteria given below. The lower the lithium deposition ratio on the surface of the negative electrode, the more lithium deposition on the surface of the negative electrode during charging is suppressed.

A: Lithium deposition ratio is less than 10%
B: Lithium deposition ratio is 10% or more and less than 15%
C: Lithium deposition ratio is 15% or more and less than 20%
D: Lithium deposition ratio is 20% or more <Output Characteristics>

The prepared lithium-ion secondary battery was charged to 4.3V at a constant current constant voltage (CCCV) in an atmosphere of 25° C. to prepare a cell. The prepared cell was discharged to 3.0V in an atmosphere of −10° C. by the constant current method at 0.2 C and 1 C to measure electric capacity. Discharge capacity retention ratio expressed by the electric capacity ratio (=(electric capacity at 1 C/electric capacity at 0.2 C)×100(%)) was calculated. These measurements were performed on 5 cells of the lithium-ion secondary battery, and the average value of the determined discharge capacity retention ratio was taken as output characteristics and evaluated on the basis of the criteria given below. A larger value indicates better output characteristics.

A: Average discharge capacity retention ratio is 80% or more.

B: Average discharge capacity retention ratio is 70% or more and less than 80%

C: Average discharge capacity retention ratio is 60% or more and less than 70%

D: Average discharge capacity retention ratio is less than 60%

Resistance Increase in Cycle Test

The produced lithium-ion secondary battery was fastened with a pressurizing jig so as to have a 1 MPa surface pressure and subjected to a cycle test at 45° C. The cycle test was performed by repeating a charging/discharging cycle 500 times with 1 C CC+CV charge (4.3V, 1/50 C Cut) and 1 C CC discharge (3.0V Cut). Thereafter, the temperature was lowered to 25° C. with the battery fastened with the pressurizing jig, and output characteristics were measured in the same manner as in <Output Characteristics> described above. Resistance retention ratio (%) before and after the cycle test (=discharge capacity retention ratio after the cycle test/discharge capacity retention ratio before the cycle test×100) was calculated and evaluated on the basis of the criteria give below. The larger the resistance retention ratio before and after the cycle test, the smaller the resistance increase in the cycle test.

A: Resistance retention ratio is 80% or more

B: Resistance retention ratio is 60% or more and less than 80%

C: Resistance retention ratio is 40% or more and less than 60%

D: Resistance retention ratio is less than 40%

Production Example 1

<Preparation of Particulate Polymer 1>

100 parts of ion-exchanged water and 0.3 parts of ammonium persulfate were supplied to a reactor equipped with a stirrer, the gas phase was replaced with nitrogen gas and the temperature was raised to 80° C. On the other hand, in another container, 40 parts of ion-exchanged water, 0.2 parts of sodium dodecylbenzene sulfonate as an emulsifier, 28.3 parts of styrene as an aromatic monovinyl monomer, 66.6 parts of 2-ethylhexyl acrylate as a monofunctional (meth) acrylic acid ester monomer, 3 parts of methacrylic acid as an acidic group-containing monomer, and 0.1 parts of ethylene glycol dimethacrylate as a cross-linkable monomer were mixed to afford a monomer composition for core. The monomer composition was continuously added to the reactor over 3 hours to carry out a polymerization reaction at a temperature of 80° C. Polymerization was continued until the polymerization conversion rate reached 95%, whereby an aqueous dispersion containing a particulate polymer for core was prepared. A monomer composition for shell that contains 1.3 parts of styrene as an aromatic monovinyl monomer, 0.65 parts of butyl acrylate, and 0.05 parts of methacrylic acid as an acidic group-containing monomer was then continuously supplied to the aqueous dispersion over 60 minutes to continue polymerization. An aqueous dispersion containing a particulate polymer 1 was prepared by cooling the reaction mass to stop the reaction once the polymerization conversion rate reached 98%.

The volume-average particle diameter, degree of swelling, and glass transition temperature of the obtained particulate polymer 1 were measured. The results are shown in Table 1.

Further, by observing a cross-sectional structure of the particulate polymer by transmission electron microscopy (TEM), it was confirmed that the particulate polymer had a core-shell structure in which a shell partially covers the outer surface of a core.

Production Example 2

<Preparation of Particulate Polymer 2>

An aqueous dispersion of a particulate polymer 2 having a core-shell structure was prepared in the same manner as in Production Example 1 except that 0.02 parts of sodium dodecylbenzene sulfonate as an emulsifier were added to a reactor equipped with a stirrer in addition to 100 parts of ion-exchanged water and 0.3 parts of ammonium persulfate. Various measurements and evaluations were made in the same manner as in Production Example 1. The results are shown in Table 1.

Production Example 3

<Preparation of Particulate Polymer 3>

An aqueous dispersion of a particulate polymer 3 having a core-shell structure was prepared in the same manner as in Production Example 2 except that the amount of sodium dodecylbenzene sulfonate added to the reactor equipped with a stirrer was changed from 0.02 parts to 0.04 parts. Various measurements and evaluations were made in the same manner as in Production Example 1. The results are shown in Table 1.

Production Example 4

<Preparation of Particulate Polymer 4>

An aqueous dispersion of a particulate polymer 4 having a core-shell structure was prepared in the same manner as in Production Example 2 except that a monomer composition for shell that contains 1.9 parts of styrene as an aromatic monovinyl monomer and 0.1 parts of methacrylic acid as an acidic group-containing monomer was used instead of the monomer composition for shell that contains 1.3 parts of styrene as an aromatic monovinyl monomer, 0.65 parts of butyl acrylate, and 0.05 parts of methacrylic acid as an acidic group-containing monomer. Various measurements and evaluations were made in the same manner as in Production Example 1. The results are shown in Table 1.

Production Example 5

<Preparation of Particulate Polymer 5>

An aqueous dispersion of a particulate polymer 5 having a core-shell structure was prepared in the same manner as in Production Example 2 except that: a monomer composition for core that contains 27.4 parts of styrene as an aromatic monovinyl monomer, 64.5 parts of 2-ethylhexyl acrylate as a monofunctional (meth)acrylic acid ester monomer, 3 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell that contains 4.9 parts of styrene as an aromatic monovinyl monomer and 0.1 parts of methacrylic acid as an acidic group-containing monomer was used instead of the monomer composition for shell that contains 1.3 parts of styrene as an aromatic monovinyl monomer, 0.65 parts of butyl acrylate, and 0.05 parts of methacrylic acid as an acidic group-containing monomer. Various measurements and evaluations were made in the same manner as in Production Example 1. The results are shown in Table 1.

Production Example 6

<Preparation of Particulate Polymer 6>

An aqueous dispersion of a particulate polymer 6 having a core-shell structure was prepared in the same manner as in Production Example 2 except that: a monomer composition for core that contains 24.5 parts of styrene as an aromatic monovinyl monomer, 57.9 parts of 2-ethylhexyl acrylate as a monofunctional (meth)acrylic acid ester monomer, 2.5 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell that contains 14.8 parts of styrene as an aromatic monovinyl monomer and 0.2 parts of methacrylic acid as an acidic group-containing monomer was used instead of the monomer composition for shell that contains 1.3 parts of styrene as an aromatic monovinyl monomer, 0.65 parts of butyl acrylate, and 0.05 parts of methacrylic acid as an acidic group-containing monomer. Various measurements and evaluations were made in the same manner as in Production Example 1. The results are shown in Table 1.

Production Example 7

<Preparation of Particulate Polymer 7>

An aqueous dispersion of a particulate polymer 7 having a core-shell structure was prepared in the same manner as in Production Example 2 except that: a monomer composition for core that contains 31.1 parts of styrene as an aromatic monovinyl monomer, 63.8 parts of 2-ethylhexyl acrylate as a monofunctional (meth)acrylic acid ester monomer, 3 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell that contains 1.9 parts of styrene as an aromatic monovinyl monomer and 0.1 parts of methacrylic acid as an acidic group-containing monomer was used instead of the monomer composition for shell that contains 1.3 parts of styrene as an aromatic monovinyl monomer, 0.65 parts of butyl acrylate butyl, and 0.05 parts of methacrylic acid as an acidic group-containing monomer. Various measurements and evaluations were made in the same manner as in Production Example 1. The results are shown in Table 1.

Production Example 8

<Preparation of Particulate Polymer 8>

An aqueous dispersion of a particulate polymer 8 having a core-shell structure was prepared in the same manner as in Production Example 2 except that: a monomer composition for core that contains 18.9 parts of styrene as an aromatic monovinyl monomer, 75.2 parts of butyl acrylate as a monofunctional (meth)acrylic acid ester monomer, 2.9 parts of methacrylic acid as an acidic group-containing monomer, and 1 part of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell that contains 1.9 parts of styrene as an aromatic monovinyl monomer and 0.1 parts of methacrylic acid as an acidic group-containing monomer was used instead of the monomer composition for shell that contains 1.3 parts of styrene as an aromatic monovinyl monomer, 0.65 parts of butyl acrylate butyl, and 0.05 parts of methacrylic acid as an acidic group-containing monomer. Various measurements and evaluations were made in the same manner as in Production Example 1. The results are shown in Table 1.

Production Example 9

<Preparation of Particulate Polymer 9>

To a reactor equipped with a stirrer were added 90 parts of ion-exchanged water and 0.5 parts of ammonium persulfate, the gas phase was replaced with nitrogen gas, and the temperature was raised to 80° C. On the other hand, in another container, 15 parts of ion-exchanged water, 1.0 parts of NEOPELEX G15 (manufactured by Kao Chemicals Global) as an emulsifier, 70.0 parts of 2-ethylhexyl acrylate as a monofunctional (meth)acrylic acid ester monomer, 25.0 parts of styrene as an aromatic monovinyl monomer, 1.7 parts of allyl glycidyl ether and 0.3 parts of allyl methacrylate as cross-linkable monomers, and 3.0 parts of acrylic acid as an acidic group-containing monomer were mixed to afford a monomer composition.

The monomer composition was added continuously to the reactor over 4 hours to cause polymerization. The reaction was performed at 80° C. while the monomer composition was continuously added. After completion of the continuous addition, stirring was continued at a temperature of 80° C. for an additional 3 hours and the reaction was completed.

The obtained aqueous dispersion was cooled to a temperature of 25° C. and adjusted to pH 8 by the addition of an aqueous sodium hydroxide solution. Steam was then introduced to remove unreacted monomers to afford an aqueous dispersion of a particulate polymer 9 without a core-shell structure. Various measurements were then made in the same manner as in Production Example 1. The results are shown in Table 1.

Production Example 10

<Preparation of Particulate Polymer 10>

To a reactor equipped with a stirrer were added 90 parts of ion-exchanged water, 0.05 parts of sodium dodecylbenzene sulfonate ("NEOPELEX G15" manufactured by Kao Chemicals Global) as an emulsifier and 0.23 parts of ammonium persulfate, the gas phase was replaced with nitrogen gas, and the temperature was raised to 70° C.

On the other hand, in another container, 50 parts of ion-exchanged water, 0.1 parts of sodium dodecylbenzene sulfonate as an emulsifier, 2.5 parts of methacrylic acid (MAA) as an acidic group-containing monomer, 10 parts of acrylonitrile (AN) as a (meth)acrylonitrile monomer, 85.3 parts of n-butyl acrylate (BA) as a monofunctional (meth) acrylic acid ester monomer, 0.2 parts of allyl methacrylate (AMA) as a cross-linkable monomer, and 2.0 parts of acrylamide (Aam) as a (meth)acrylamide monomer were mixed to afford a monomer composition. The monomer composition was added continuously to the reactor over 4 hours to cause polymerization. The reaction was performed at 80° C. while the monomer composition was continuously added. After completion of the continuous addition, stirring was continued at a temperature of 80° C. for an additional 3 hours and the reaction was completed. In this way an aqueous dispersion containing a particulate polymer 10 without a core-shell structure was prepared. Various measurements and evaluations were made in the same manner as in Production Example 1. The results are shown in Table 1.

Comparative Production Example 1

<Preparation of Particulate Polymer 11>

An aqueous dispersion of a particulate polymer 11 having a core-shell structure was prepared in the same manner as in Production Example 2 except that: a monomer composition for core that contains 20.2 parts of styrene as an aromatic monovinyl monomer, 47.6 parts of 2-ethylhexyl acrylate as a monofunctional (meth)acrylic acid ester monomer, 2.1 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell that contains 29.7 parts of styrene as an aromatic monovinyl monomer and 0.3 parts of methacrylic acid as an acidic group-containing monomer was used instead of the monomer composition for shell that contains 1.3 parts of styrene as an aromatic monovinyl monomer, 0.65 parts of butyl acrylate butyl, and 0.05 parts of methacrylic acid as an acidic group-containing monomer. Various measurements and evaluations were made in the same manner as in Production Example 1. The results are shown in Table 1.

Comparative Production Example 2

<Preparation of Particulate Polymer 12>

An aqueous dispersion of a particulate polymer 12 without a core-shell structure was prepared in the same manner as in Production Example 2 except that: a monomer composition for core that contains 28.9 parts of styrene as an aromatic monovinyl monomer, 68 parts of 2-ethylhexyl acrylate as a monofunctional (meth)acrylic acid ester monomer, 3 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell was not supplied. Various measurements and evaluations were made in the same manner as in Production Example 1. The results are shown in Table 1.

Comparative Production Example 3

<Preparation of Particulate Polymer 13>

An aqueous dispersion of a particulate polymer 13 having a core-shell structure was prepared in the same manner as in Production Example 2 except that: a monomer composition for core that contains 28.6 parts of styrene as an aromatic monovinyl monomer, 67.3 parts of 2-ethylhexyl acrylate as a monofunctional (meth)acrylic acid ester monomer, 3 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer; and a monomer composition for shell that contains 0.95 parts of styrene as an aromatic monovinyl monomer and 0.05 parts of methacrylic acid as an acidic group-containing monomer was used instead of the monomer composition for shell that contains 1.3 parts of styrene as an aromatic monovinyl monomer, 0.65 parts of butyl acrylate butyl, and 0.05 parts of methacrylic acid as an acidic group-containing monomer. Various measurements and evaluations were made in the same manner as in Production Example 1. The results are shown in Table 1.

Comparative Production Example 4

<Preparation of Particulate Polymer 14>

An aqueous dispersion of a particulate polymer 14 having a core-shell structure was prepared in the same manner as in Production Example 1 except that a monomer composition for core that contains 56.5 parts of styrene as an aromatic monovinyl monomer, 38.4 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer was used instead of the monomer composition for core that contains 28.3 parts of styrene as an aromatic monovinyl monomer, 66.6 parts of 2-ethylhexylacrylate as a monofunctional (meth)acrylic acid ester monomer, 3 parts of methacrylic acid as an acidic group-containing monomer, and 0.1 parts of ethylene glycol dimethacrylate as a cross-linkable monomer. Various measurements and evaluations were made in the same manner as in Production Example 1. The results are shown in Table 1.

Comparative Production Example 5

<Production of Particulate Polymer 15)

60 parts of 2-ethylhexyl acrylate, 15 parts of styrene and 5 parts of methacrylic acid as a monomer composition for core, 1 part of sodium dodecyl benzenesulfonate as an emulsifier, 150 parts of ion-exchanged water, and 0.5 parts of potassium persulfate as a polymerization initiator were placed in a 5 MPa pressure-resistant container equipped with a stirrer, and the mixture was sufficiently stirred. Temperature was raised to 60° C. by heating to initiate polymerization. Polymerization was continued until the polymerization conversion rate reached 96%, whereby an aqueous dispersion containing a particulate polymer for core was prepared.

20 parts of styrene as a monomer composition for shell was then continuously added to the aqueous dispersion, and the mixture was heated to 70° C. to continue polymerization. The reaction mass was cooled to stop the reaction once the polymerization conversion rate reached 96% to prepare an aqueous dispersion containing a particulate polymer 15 having a core-shell structure. Various measurements and evaluations were made in the same manner as in Production Example 1. The results are shown in Table 1.

Example 1

<Preparation of Composition for Adhesive Layer>

The aqueous dispersion of the particulate polymer 1 obtained in Production Example 1 and the aqueous dispersion of the particulate polymer 9 obtained in Production Example 9 were blended so that the mass ratio of solids of the particulate polymer 1 to particulate polymer 9 became 100:10, followed by the addition of ion-exchanged water to dilute the resulting mixture to a solid content concentration of 10.5%. Propylene glycol was further added to the obtained mixture to adjust the solid content concentration to 10% to afford a composition for an adhesive layer.

<Preparation of Negative Electrode Web>

33 parts of 1,3-butadiene, 3.5 parts of itaconic acid, 63.5 parts of styrene, 0.4 parts of sodium dodecylbenzenesulfonate as an emulsifier, 150 parts of ion-exchanged water, and 0.5 parts of potassium persulfate as a polymerization initiator were placed into a 5 MPa pressure reactor equipped with a stirrer, and the mixture was sufficiently stirred and then heated to 50° C. to initiate polymerization. Once the polymerization conversion rate reached 96%, cooling was performed to stop the reaction to afford a mixture containing a binder (SBR) for a negative electrode mixed material layer. The mixture including a binder for a negative electrode mixed material layer was adjusted to pH 8 by the addition of 5% sodium hydroxide aqueous solution, and unreacted monomers were removed by vacuum distillation under heating. The mixture was cooled to 30° C. or lower to afford an aqueous dispersion containing a desired binder for a negative electrode mixed material layer.

Next, 100 parts of artificial graphite (volume-average particle diameter: 15.6 μm) as a negative electrode active material, 1 part (in terms of solids) of 2% aqueous solution of carboxymethylcellulose sodium salt ("MAC350HC" manufactured by Nippon Paper Industries Co., Ltd.,) as a viscosity-adjusting agent, and ion-exchanged water were mixed to prepare a mixture having a solid content concentration of 68%, and the mixture was further mixed at 25° C. for 60 minutes. The mixture was adjusted to have a solid content concentration of 62% with ion-exchanged water and then further mixed at a temperature of 25° C. for 15 minutes. To the mixture obtained was added 1.5 parts (in terms of solids) of the aqueous dispersion containing a binder for a negative electrode mixed material layer described above and ion-exchanged water so that the mixture had a final solid content concentration of 52%, followed by mixing for an additional 10 minutes. The resultant mixture was subjected to defoaming treatment under reduced pressure to afford a slurry composition for a non-aqueous secondary battery negative electrode having good fluidity.

The obtained slurry composition for a non-aqueous secondary battery negative electrode was applied by a comma coater on both surfaces of a copper foil having a thickness of 20 μm, which is a current collector, so that the film thickness after drying was about 150 μm, and dried. The drying was carried out by conveying the copper foil at a rate of 0.5 m/in an oven at 60° C. for 2 minutes. Thereafter, heat treatment was performed at a temperature of 120° C. for 2 minutes to afford a negative electrode web before pressing. The negative electrode web before pressing was rolled by a roll press to afford a pressed negative electrode web with a thickness of the negative electrode mixed material layer of 80 μm.

<Preparation of Positive Electrode Web>

100 parts of $LiCoO_2$ having a volume-average particle diameter of 12 μm as a positive electrode active material, 2 parts of acetylene black ("HS-100" manufactured by Denka Company Limited) as a conductive material, 2 parts (in terms of solids) of polyvinylidene fluoride ("#7208" manufactured by KUREHA CORPORATION) as a binder, and N-methylpyrrolidone as solvent were mixed to afford a mixture having a total solid content concentration of 70%. These materials were mixed with a planetary mixer to afford a slurry composition for a non-aqueous secondary battery positive electrode.

The obtained slurry composition for a non-aqueous secondary battery positive electrode was applied by a comma coater on both surfaces of an aluminum foil having a thickness of 20 μm, which is a current collector, so that the film thickness after drying was about 150 μm, and dried. This drying was carried out by conveying the aluminum foil at a rate of 0.5 m/min in an oven at 60° C. for 2 minutes. Thereafter, heat treatment was performed for 2 minutes at a temperature of 120° C. to afford a positive electrode web.

Then, the obtained positive electrode web was rolled using a roll press machine to afford a pressed positive electrode web having a positive electrode mixed material layer.

<Preparation of Separator Web>

A separator web made of polyethylene (PE) ("ND412" manufactured by Asahi Kasei Corporation) was prepared.

<Production of Laminate>

Figure 3:
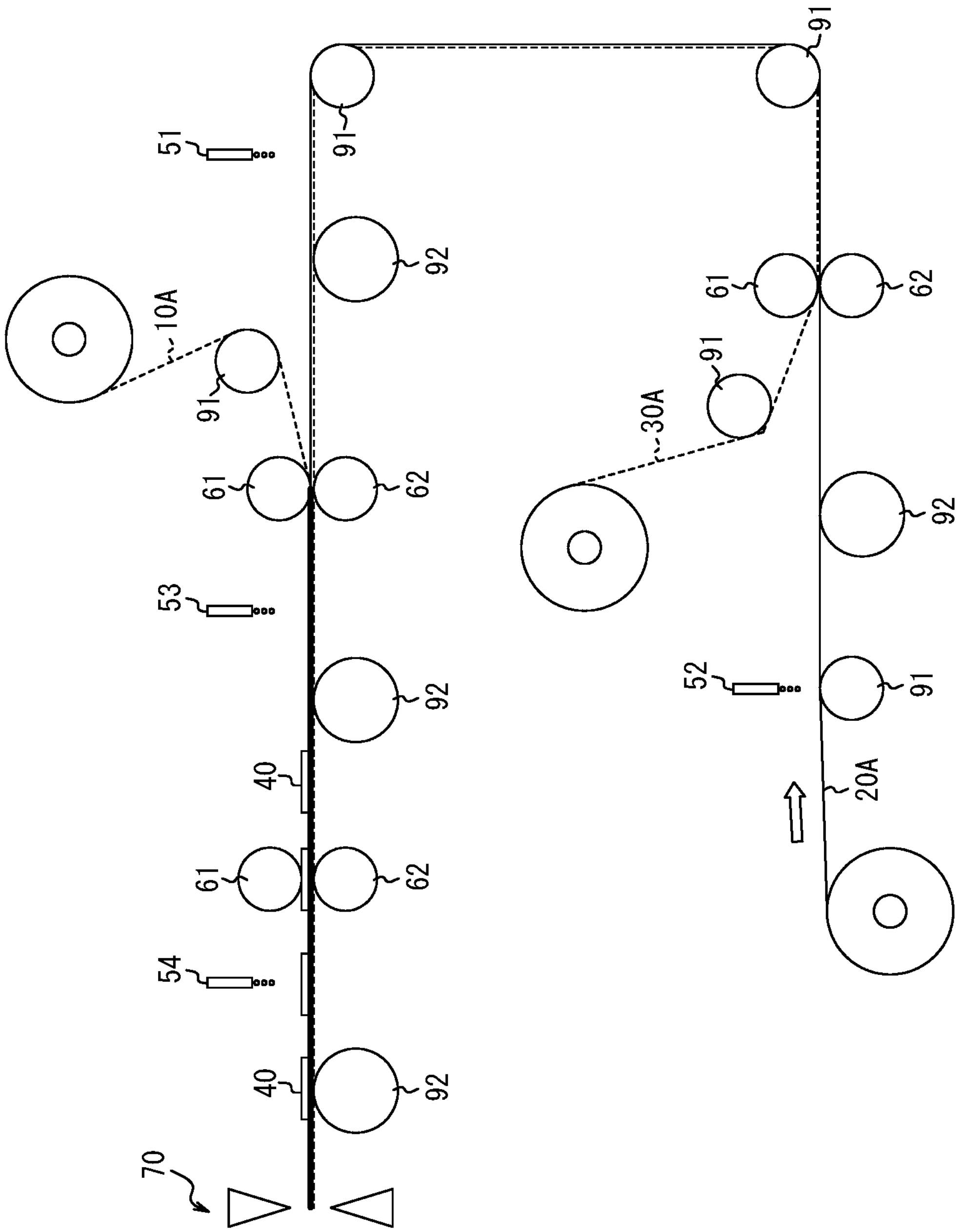
FIG. 3 is an illustration for explaining a production process of a laminate for a non-aqueous secondary battery in Examples and Comparative Examples.

A laminate was produced using the prepared composition for an adhesive layer, negative electrode web, positive electrode web, and separator web in the manner shown in FIG. 3. In FIG. 3, reference numeral 91 denotes a conveying roller, and reference numeral 92 denotes a heat roller.

Specifically, with a negative electrode web 20A, fed from a roll of a negative electrode web, being conveyed at a rate of 10 m/min, an adhesive layer composition was supplied from the inkjet head of an inkjet coater 52 (KM1024 (shear mode type), manufactured by Konica Minolta Inc.) on one side of the negative electrode web 20A, and a second separator web 30A, fed from a roll of a separator web, and the web 20A of negative electrode were bonded to each other with press rollers 61, 62. On the other side of the negative electrode web 20A, the composition for an adhesive layer was supplied from the inkjet head of an inkjet coater 51 (KM1024 (shear mode type), manufactured by Konica Minolta Inc.), and a first separator web 10A, fed from a roll of a separator web, and a laminate of the negative electrode web 20A and the second separator web 30A were bonded to each other with press rollers 61, 62. Further, the composition for an adhesive layer was supplied from the inkjet head of an inkjet coater 53 (KM1024 (shear mode type) manufactured by Konica Minolta Inc.) to a surface of the first separator web 10A, opposite to the negative electrode web 20A side, and a positive electrode previously cut was placed on the surface. Thereafter, a laminate of the first separator web 10A, negative electrode web 20A and web 30A of second separator was bonded to the positive electrode with press rollers 61, 62. Then, after the composition for an adhesive layer was supplied from the inkjet head of an inkjet coater 54 (KM1024 (shear mode type), manufactured by Konica Minolta Inc.) onto the positive electrode 40, the laminate was cut by a cutting machine 70 to provide a laminate in which a second separator, a negative electrode, a first separator, and a positive electrode were laminated in the order presented. Here, the end portions of the current collectors of the positive electrode 40 and the web 20A of negative electrode are provided with portions where the electrode mixed material layer (positive electrode mixed material layer or negative electrode mixed material layer) is not formed, and are punched so that tabs of a desired size are formed in advance, and lamination was performed so that the positive electrode tabs and the negative electrode tabs were disposed on the same edge side on the bonding surface X,Y between the electrode and the separator.

Bonding by the rollers 61 and 62 was performed at 25° C. and at pressure of 2 MPa.

Further, the supplied composition for an adhesive layer was dried by using heat rollers 92 as some of the conveyance rollers 91 (drying temperature: 70° C., drying time: 1 second).

The composition for an adhesive layer was supplied from the coaters 51 to 54 so that the composition had a uniform dot-like pattern. The dot size was 100 μm in diameter and the interval was 400 μm pitch. The basis weight of the adhesive material was 0.2 g/m 2. Coverage of the adhesive layer was 6.5%.

<Production of Secondary Battery>

Further, 5 laminates produced in the manner described above were placed on top of one another and pressed at 25° C. and at a pressure of 2 MPa for 10 seconds to prepare a stack, which was then wrapped in an aluminum packaging material as an outer package, and electrolyte solution (solvent: ethylene carbonate/diethyl carbonate/vinylene carbonate=68.5/30/1.5 (volume ratio), electrolyte: 1M $LiPF_6$) was injected. Thereafter, the opening of the outer package was closed by heat sealing at a temperature of 150° C. to fabricate a laminate-type lithium-ion secondary battery having a capacity of 800 mAh. The obtained secondary battery was evaluated for lithium deposition ratio on the negative electrode surface, output characteristics, and resistance increase in a cycle test. The results are shown in Table 2.

Example 2

A composition for an adhesive layer, a negative electrode web, a positive electrode web, a separator web, a laminate, and a secondary battery were prepared or produced in the same manner as in Example 1 except that the aqueous dispersion of the particulate polymer 2 obtained in Production Example 2 was used instead of the aqueous dispersion of the particulate polymer 1 obtained in Production Example 1.

Various measurements and evaluations were made in the same manner as in Example 1. The results are shown in Table 2.

Example 3

A composition for an adhesive layer, a negative electrode web, a positive electrode web, a separator web, a laminate, and a secondary battery were prepared or produced in the same manner as in Example 1 except that the aqueous dispersion of the particulate polymer 3 obtained in Production Example 3 was used instead of the aqueous dispersion of the particulate polymer 1 obtained in Production Example 1.

Various measurements and evaluations were made in the same manner as in Example 1. The results are shown in Table 2.

Example 4

A composition for an adhesive layer, a negative electrode web, a positive electrode web, a separator web, a laminate, and a secondary battery were prepared or produced in the same manner as in Example 1 except that the aqueous dispersion of the particulate polymer 4 obtained in Production Example 4 was used instead of the aqueous dispersion of the particulate polymer 1 obtained in Production Example 1.

Various measurements and evaluations were made in the same manner as in Example 1. The results are shown in Table 2.

Example 5

A composition for an adhesive layer, a negative electrode web, a positive electrode web, a separator web, a laminate, and a secondary battery were prepared or produced in the same manner as in Example 1 except that the aqueous dispersion of the particulate polymer 5 obtained in Production Example 5 was used instead of the aqueous dispersion of the particulate polymer 1 obtained in Production Example 1.

Various measurements and evaluations were made in the same manner as in Example 1. The results are shown in Table 2.

Example 6

A composition for an adhesive layer, a negative electrode web, a positive electrode web, a separator web, a laminate, and a secondary battery were prepared or produced in the same manner as in Example 1 except that the aqueous dispersion of the particulate polymer 6 obtained in Production Example 6 was used instead of the aqueous dispersion of the particulate polymer 1 obtained in Production Example 1.

Various measurements and evaluations were made in the same manner as in Example 1. The results are shown in Table 2.

Example 7

In the preparation of the adhesive layer composition of Example 1, an adhesive layer composition, a negative electrode original material, a positive electrode original material, a separator original material, a laminate, and a secondary battery were prepared and prepared in the same manner as in Example 1 except that the aqueous dispersion of the particulate polymer 7 obtained in Production Example 7 was used instead of the aqueous dispersion of the particulate polymer 1 obtained in Production Example 1.

Various measurements and evaluations were made in the same manner as in Example 1. The results are shown in Table 2.

Example 8

A composition for an adhesive layer, a negative electrode web, a positive electrode web, a separator web, a laminate, and a secondary battery were prepared or produced in the same manner as in Example 1 except that the aqueous dispersion of the particulate polymer 8 obtained in Production Example 8 was used instead of the aqueous dispersion of the particulate polymer 1 obtained in Production Example 1.

Various measurements and evaluations were made in the same manner as in Example 1. The results are shown in Table 2.

Example 9

A composition for an adhesive layer, a negative electrode web, a positive electrode web, a separator web, a laminate, and a secondary battery were prepared or produced in the same manner as in Example 1 except that the aqueous dispersion of the particulate polymer 10 obtained in Production Example 10 was used instead of the aqueous dispersion of the particulate polymer 9 obtained in Production Example 9.

Various measurements and evaluations were made in the same manner as in Example 1. The results are shown in Table 2.

Example 10

A composition for an adhesive layer, a negative electrode web, a positive electrode web, a separator web, a laminate, and a secondary battery were prepared or produced in the same manner as in Example 1 except that a separator web made of polypropylene (PP) (“Celgard #2500” manufactured by Asahi Kasei Corporation) was used instead of a separator web made of polyethylene (PE) (“ND412” manufactured by Asahi Kasei Corporation).

Various measurements and evaluations were made in the same manner as in Example 1. The results are shown in Table 2.

Comparative Example 1

A composition for an adhesive layer, a negative electrode web, a positive electrode web, a separator web, a laminate, and a secondary battery were prepared or produced in the same manner as in Example 1 except that the aqueous dispersion of the particulate polymer 11 obtained in Comparative Production Example 1 was used instead of the aqueous dispersion of the particulate polymer 1 obtained in Production Example 1.

Various measurements and evaluations were made in the same manner as in Example 1. The results are shown in Table 2.

Comparative Example 2

A composition for an adhesive layer, a negative electrode web, a positive electrode web, and a separator web were prepared or produced in the same manner as in Example 1 except that the aqueous dispersion of the particulate polymer 12 obtained in Comparative Production Example 2 was used instead of the aqueous dispersion of the particulate polymer 1 obtained in Production Example 1.

Various measurements and evaluations were made in the same manner as in Example 1. The results are shown in Table 2. When the inkjet discharge characteristics of the composition for an adhesive layer were evaluated in the same manner as in Example 1, the composition could not be discharged. As such, it was not possible to produce a laminate and a secondary battery.

Comparative Example 3

A composition for an adhesive layer, a negative electrode web, a positive electrode web, a separator web, a laminate, and a secondary battery were prepared or produced in the same manner as in Example 1 except that the aqueous dispersion of the particulate polymer 13 obtained in Comparative Production Example 3 was used instead of the aqueous dispersion of the particulate polymer 1 obtained in Production Example 1.

Various measurements and evaluations were made in the same manner as in Example 1. The results are shown in Table 2.

Comparative Example 4

A composition for an adhesive layer, a negative electrode web, a positive electrode web, a separator web, a laminate, and a secondary battery were prepared or produced in the same manner as in Example 1 except that the aqueous dispersion of the particulate polymer 14 obtained in Comparative Production Example 4 was used instead of the aqueous dispersion of the particulate polymer 1 obtained in Production Example 1.

Various measurements and evaluations were made in the same manner as in Example 1. The results are shown in Table 2.

Comparative Example 5

A composition for an adhesive layer, a negative electrode web, a positive electrode web, a separator web, a laminate, and a secondary battery were prepared or produced in the same manner as in Example 1 except that the aqueous dispersion of the particulate polymer 15 obtained in Comparative Production Example 5 was used instead of the aqueous dispersion of the particulate polymer 1 obtained in Production Example 1.

Various measurements and evaluations were made in the same manner as in Example 1. The results are shown in Table 2.

In Tables 1 and 2 below,

“MMA” denotes methyl methacrylate;

“BA” denotes butyl acrylate;

“2EHA” indicates 2-ethylhexyl acrylate;

“AN” denotes acrylonitrile;

“ST” denotes styrene;

“MAA” denotes methacrylic acid;

“AA” denotes acrylic acid;

“Aam” denotes acrylamide;

“AGE” denotes allyl glycidyl ether;

"AMA" denotes allyl methacrylate;

"EDMA" denotes ethylene glycol dimethacrylate;

"PE" denotes polyethylenes, and

"PP" denotes polypropylene.

TABLE 1

| | | | Production Example 1 Particulate polymer 1 | Production Example 2 Particulate polymer 2 | Production Example 3 Particulate polymer 3 | Production Example 4 Particulate polymer 4 | Production Example 5 Particulate polymer 5 | Production Example 6 Particulate polymer 6 | Production Example 7 Particulate polymer 7 | Production Example 8 Particulate polymer 8 |
|---|---|---|---|---|---|---|---|---|---|---|
| Chemical composition [mass %] | Core | MMA | — | — | — | — | — | — | — | — |
| | | BA | — | — | — | — | — | — | — | 75.2 |
| | | 2EHA | 66.6 | 66.6 | 66.6 | 66.6 | 64.5 | 57.9 | 63.8 | — |
| | | AN | — | — | — | — | — | — | — | — |
| | | St | 28.3 | 28.3 | 28.3 | 28.3 | 27.4 | 24.5 | 31.1 | 18.9 |
| | | MAA | 3 | 3 | 3 | 3 | 3 | 2.5 | 3 | 2.9 |
| | | AA | — | — | — | — | — | — | — | — |
| | | Aam | — | — | — | — | — | — | — | — |
| | | AGE | — | — | — | — | — | — | — | — |
| | | AMA | — | — | — | — | — | — | — | — |
| | | EDMA | 0.1 | 0.1 | 0.1 | 0.1 | 0.1 | 0.1 | 0.1 | 1 |
| | Shell | St | 1.3 | 1.3 | 1.3 | 1.9 | 4.9 | 14.8 | 1.9 | 1.9 |
| | | BA | 0.65 | 0.65 | 0.65 | — | — | — | — | — |
| | | MAA | 0.05 | 0.05 | 0.05 | 0.1 | 0.1 | 0.2 | 0.1 | 0.1 |
| Mass percentage of shell with respect to total of core and shell [%] | | | 2 | 2 | 2 | 2 | 5 | 15 | 2 | 2 |
| Glass transition temperature [° C.] | | Core | −18 | −18 | −18 | −18 | −18 | −18 | 5 | −15 |
| | | Shell | 53 | 53 | 53 | 105 | 105 | 105 | 105 | 105 |
| Volume-average particle diameter D50 [nm] | | | 700 | 270 | 150 | 270 | 275 | 285 | 270 | 273 |
| Degree of swelling [%] | | | 170 | 170 | 170 | 170 | 170 | 170 | 170 | 250 |

| | | | Production Example 9 Particulate polymer 9 | Production Example 10 Particulate polymer 10 | Comparative Production Example 1 Particulate polymer 11 | Comparative Production Example 2 Particulate polymer 12 | Comparative Production Example 3 Particulate polymer 13 | Comparative Production Example 4 Particulate polymer 14 | Comparative Production Example 5 Particulate polymer 15 |
|---|---|---|---|---|---|---|---|---|---|
| Chemical composition [mass %] | Core | MMA | — | — | — | — | — | — | — |
| | | BA | — | 85.3 | — | — | — | — | — |
| | | 2EHA | 70 | — | 47.6 | 68 | 67.3 | 38.4 | 60 |
| | | AN | — | 10 | — | — | — | — | — |
| | | St | 25 | — | 20.2 | 28.9 | 28.6 | 56.5 | 15 |
| | | MAA | — | 2.5 | 2.1 | 3 | 3 | 3 | 5 |
| | | AA | 3 | — | — | — | — | — | — |
| | | Aam | — | 2 | — | — | — | — | — |
| | | AGE | 1.7 | — | — | — | — | — | — |
| | | AMA | 0.3 | 0.2 | — | — | — | — | — |
| | | EDMA | — | — | 0.1 | 0.1 | 0.1 | 0.1 | — |
| | Shell | St | — | — | 29.7 | — | 0.95 | 1.3 | 20 |
| | | BA | | | | — | — | 0.65 | — |
| | | MAA | | | 0.3 | — | 0.05 | 0.05 | — |
| Mass percentage of shell with respect to total of core and shell [%] | | | — | — | 30 | — | 1 | 2 | 20 |
| Glass transition temperature [° C.] | | Core | −25 | −18 | −18 | −18 | −18 | 35 | −25 |
| | | Shell | | | 105 | | 105 | 53 | 100 |
| Volume-average particle diameter D50 [nm] | | | 200 | 140 | 300 | 260 | 265 | 700 | 450 |
| Degree of swelling [%] | | | 170 | 580 | 170 | 170 | 170 | 170 | 300 |

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Coating Condition | Coating method | Inkjet | Inkjet | Inkjet | Inkjet | Inkjet | Inkjet | Inkjet | Inkjet |
| | Coating pattern | Dot | Dot | Dot | Dot | Dot | Dot | Dot | Dot |
| | Composition for adhesive layer | Particulate polymer 1 Particulate polymer 9 | Particulate polymer 2 Particulate polymer 9 | Particulate polymer 3 Particulate polymer 9 | Particulate polymer 4 Particulate polymer 9 | Particulate polymer 5 Particulate polymer 9 | Particulate polymer 6 Particulate polymer 9 | Particulate polymer 7 Particulate polymer 9 | Particulate polymer 8 Particulate polymer 9 |
| | Coverage of adhesive layer [%] | 6.50 | 6.50 | 6.50 | 6.50 | 6.50 | 6.50 | 6.50 | 6.50 |
| Material of separator substrate | | PE | PE | PE | PE | PE | PE | PE | PE |
| Pressure sensitivity of adhesion strength (N/m/Mpa) | | 60 | 60 | 60 | 72 | 45 | 21 | 40 | 77 |
| Evaluations | Inkjet discharge characteristics | A | A | A | A | A | A | A | A |
| | Adhesion strength | A | B | C | B | C | D | C | B |
| | Lithium deposition ratio on negative electrode surface | A | B | C | B | B | B | B | C |

-continued

| | | | | | | | | |
|---|---|---|---|---|---|---|---|---|
| Output characteristics | A | B | C | B | B | B | B | C |
| Resistance increase in cycle test | A | B | B | B | B | B | B | C |

| | | Ex. 9 | Ex. 10 | Comp. Ex. 1 | Comp. Ex. 2 | Comp. Ex. 3 | Comp. Ex. 4 | Comp. Ex. 5 |
|---|---|---|---|---|---|---|---|---|
| Coating Condition | Coating method | Inkjet | Inkjet | Inkjet | Inkjet | Inkjet | Inkjet | Inkjet |
| | Coating pattern | Dot | Dot | Dot | Dot | Dot | Dot | Dot |
| | Composition for adhesive layer | Particulate polymer 1 Particulate polymer 10 | Particulate polymer 1 Particulate polymer 9 | Particulate polymer 11 Particulate polymer 9 | Particulate polymer 12 Particulate polymer 9 | Particulate polymer 13 Particulate polymer 9 | Particulate polymer 14 Particulate polymer 9 | Particulate polymer 15 Particulate polymer 9 |
| | Coverage of adhesive layer [%] | 6.50 | 6.50 | 6.50 | Drawing failed | 6.50 | 6.50 | 6.50 |
| Material of separator substrate | | PE | PP | PE | PE | PE | PE | PE |
| Pressure sensitivity of adhesion strength (N/m/Mpa) | | 61 | 60 | 5 | 8 | 95 | 3 | 15 |
| Evaluations | Inkjet discharge characteristics | A | A | A | C | B | A | A |
| | Adhesion strength | A | B | E | — | A | E | E |
| | Lithium deposition ratio on negative electrode surface | A | A | B | — | B | B | B |
| | Output characteristics | A | A | B | — | B | B | B |
| | Resistance increase in cycle test | A | A | B | — | D | B | B |

As can be seen from the results shown in Table 2, Examples 1 to 10 that used a composition for a non-aqueous secondary battery adhesive layer whose pressure sensitivity of adhesion strength was greater than 20 and less than 80 were able to simultaneously attain inkjet discharge characteristics, adhesion strength, and battery characteristics (output characteristics, resistance increase in the cycle test) at a high level. On the other hand, it can be seen that Comparative Examples 1 to 5 that used a composition for a non-aqueous secondary battery adhesive layer whose pressure sensitivity of adhesion strength was outside the range of greater than 20 and less than 80 failed to simultaneously attain inkjet discharge characteristics, adhesion strength, and battery characteristics (output characteristics, resistance increase in the cycle test) at a high level.

It appears that Example 6 showed a low adhesion strength because the particulate polymer comprises a high mass percentage of a shell, which has a high glass transition temperature.

It appears that Example 8 showed slightly deteriorated battery characteristics because the particulate polymer had a high degree of swelling due to a high content of a butyl acrylate monomer unit.

It appears that Example 10 showed a slightly low adhesion strength because a polypropylene separator has a higher hydrophobicity than a polyethylene separator.

INDUSTRIAL APPLICABILITY

According to the present disclosure, it is possible to provide a composition for a non-aqueous secondary battery adhesive layer that can provide a non-aqueous secondary battery adhesive layer capable of firmly bonding battery members to each other by pressing at normal temperature and that can allow a non-aqueous secondary battery to exhibit good battery characteristics while securing inkjet discharge characteristics.

According to the present disclosure, it is also possible to provide an adhesive layer for a non-aqueous secondary battery that can firmly bond battery members to each other by pressing at normal temperature and that can allow a non-aqueous secondary battery to exhibit good electrical characteristics.

According to the present disclosure, it is also possible to provide a laminate for a non-aqueous secondary battery that can allow a non-aqueous secondary battery to exhibit good electrical characteristics.

According to the present disclosure, it is also possible to provide a non-aqueous secondary battery having good electrical characteristics.

According to the present disclosure, it is also possible to provide a method for producing an adhesive layer for a non-aqueous secondary battery, which adhesive layer can firmly bond battery members to each other by pressing at normal temperature and can allow a non-aqueous secondary battery to exhibit good electrical characteristics.

According to the present disclosure, it is also possible to provide a method for producing a laminate for a non-aqueous secondary battery, which laminate can allow a non-aqueous secondary battery to exhibit good electrical characteristics.

REFERENCE SIGNS LIST

10A First separator web
20A Negative electrode web
30A Second separator web
40 Positive electrode
50 Droplet
51-54 Coater (nozzle head)
61, 62 Press roller
70 Cutting machine
91 Conveying roller
92 Heat roller
300 Particulate polymer
310 Core
310S Outer surface of core
320 Shell

The invention claimed is:

1. A composition for a non-aqueous secondary battery adhesive layer, comprising a particulate polymer, wherein a value of pressure sensitivity of adhesion strength as obtained using the following formula (1) is greater than 20 and less than 80:

$$\text{pressure sensitivity of adhesion strength}(\text{N}/(\text{m}\cdot\text{MPa}))=(T3-T1)/2 \quad (1)$$

where T1 represents an adhesion strength (N/m) between a polyethylene separator and an adhesive layer for a non-aqueous secondary battery adhesive layer that is obtained from the composition for a non-aqueous secondary battery adhesive layer when the polyethylene separator and the adhesive layer are bonded by pressing at 25° C. and a pressure of 1 MPa for 10 seconds, and T3 represents an adhesion strength (N/m) between the polyethylene separator and the adhesive layer when the polyethylene separator and the adhesive layer are bonded by pressing at 25° C. and a pressure of 3 MPa for 10 seconds;

wherein the particulate polymer has a core-shell structure comprising a core and a shell partially covering an outer surface of the core, the core has a glass transition temperature of −50° C. or higher and 25° C. or lower, the shell has a glass transition temperature of 50° C. or higher and 200° C. or lower, and a mass percentage of the shell with respect to a total of the core and the shell is 2% by mass or more and 15% by mass or less.

2. The composition for a non-aqueous secondary battery adhesive layer according to claim 1, wherein the core has a glass transition temperature of −40° C. or higher and 25° C. or lower.

3. The composition for a non-aqueous secondary battery adhesive layer according to claim 1, wherein the particulate polymer has a volume-average particle diameter of 100 nm or more and 1,500 nm or less.

4. An adhesive layer for a non-aqueous secondary battery, obtained using the composition for a non-aqueous secondary battery adhesive layer according to claim 1.

5. A laminate for a non-aqueous secondary battery, comprising an electrode and a separator, wherein the electrode and the separator are bonded to each other via the adhesive layer for a non-aqueous secondary battery according to claim 4.

6. A non-aqueous secondary battery comprising the laminate for a non-aqueous secondary battery according to claim 5.

7. A method for producing an adhesive layer for a non-aqueous secondary battery, comprising:

applying on a substrate the composition for a non-aqueous secondary battery adhesive layer according to claim 1 by an ink jet method; and drying the composition for a non-aqueous secondary battery adhesive layer applied on the substrate.

8. A method for producing a laminate for a non-aqueous secondary battery, comprising:

supplying an adhesive material to a bonding surface of at least one of an electrode and a separator; and bonding the electrode and the separator via the bonding surface supplied with the adhesive material by pressing at normal temperature, wherein the adhesive material is obtained using the composition for a non-aqueous secondary battery adhesive layer according to claim 1.

* * * * *